(12) United States Patent
Stachiw et al.

(10) Patent No.: US 8,891,746 B2
(45) Date of Patent: *Nov. 18, 2014

(54) SYSTEM AND METHOD FOR PROFITABLE OPERATION OF AN UNLIMITED COMMUNICATIONS PLAN

(75) Inventors: Mark A. Stachiw, Parker, TX (US); Garreth A. Sarosi, Dallas, TX (US); Kenneth Jessen, Dallas, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 166 days.

This patent is subject to a terminal disclaimer.

(21) Appl. No.: 13/571,162

(22) Filed: Aug. 9, 2012

(65) Prior Publication Data

US 2013/0315386 A1 Nov. 28, 2013

Related U.S. Application Data

(60) Provisional application No. 61/650,331, filed on May 22, 2012.

(51) Int. Cl.
*H04M 15/00* (2006.01)

(52) U.S. Cl.
CPC .............. *H04M 15/47* (2013.01); *H04M 15/58* (2013.01)
USPC ................. 379/114.14; 379/112.06

(58) Field of Classification Search
CPC .............................. H04M 15/47; H04M 15/58
USPC ......................................... 379/114.14, 112.06
See application file for complete search history.

(56) References Cited

U.S. PATENT DOCUMENTS

| 2001/0012345 | A1* | 8/2001 | Nolting et al. ............ 379/112.01 |
| 2006/0019632 | A1* | 1/2006 | Cunningham et al. ........ 455/408 |
| 2008/0187118 | A1* | 8/2008 | Short .............................. 379/133 |
| 2010/0035576 | A1 | 2/2010 | Jones et al. |
| 2012/0020218 | A1* | 1/2012 | Li et al. ......................... 370/235 |
| 2012/0129489 | A1 | 5/2012 | Cassidy et al. |

* cited by examiner

*Primary Examiner* — Sonia Gay
(74) *Attorney, Agent, or Firm* — Dentons US LLP

(57) ABSTRACT

A system and method for profitably operating communications services may include providing a service plan inclusive of at least a portion of the communications services being unlimited for a user. A computing system may collect usage data of the user during a time period associated with the unlimited portion of the service plan. The computing system may determine whether the usage data is indicative of the user using the communications services in violation of service terms and conditions associated with the unlimited portion of the service plan. The computing system may perform an action in response to determining that the user is in violation of the terms and conditions.

37 Claims, 19 Drawing Sheets

FIG. 17

SERVICE PROVIDER
MANAGE USERS SITE

NOV '11 USERS INTERNATIONAL USAGE REPORT

| USER ID | COUNTRIES | | INT'L CALLS | MINUTES OF USAGE | TERMS AND CONDITIONS VIOLATION | ACTION(S) | |
|---------|-----------|---|-------------|------------------|-------------------------------|-----------|---|
| | | | | | | USER NOTICE | CANCEL SERVICE |
| 1042371 | 17 | VIEW | 1874 | 8624 MINS | 3.1 | ☒ | ☒ |
| 2849421 | 12 | VIEW | 1524 | 6724 MINS | 3.1 | ☒ | ☒ |
| 7238426 | 5 | VIEW | 624 | 1206 MINS | - | ☐ | ☐ |
| ... | ... | | ... | ... | ... | ... | ... |

SUBMIT

FIG. 19

SERVICE PROVIDER
MANAGE USERS SITE

NOV '11 USERS EXCESSIVE USAGE REPORT

| USER ID | MINUTES OF USAGE | USAGE CATEGORIES OUTBOUND CALLS | AVERAGE CALL DURATION | CALLS TO NUMBERS ON EXCESSIVE CALL LIST | TERMS AND CONDITIONS VIOLATION | ACTION(S) | |
|---------|------------------|----------------------------------|------------------------|-------------------------------------------|-------------------------------|-----------|---|
| | | | | | | USER NOTICE | CANCEL SERVICE |
| 7234127 | 1206 | 64% | 78 MINS | 54% | 1.03, 1.04 | ☒ | ☐ |
| 2743685 | 1847 | 92% | 27 MINS | 0% | 1.02 | ☒ | ☒ |
| 1645762 | 3208 | 96% | 66 MINS | 99% | 1.01, 1.02, 1.03, 1.04 | ☒ | ☒ |
| ⋯ | ⋯ | ⋯ | ⋯ | ⋯ | ⋯ | ⋯ | ⋯ |

SUBMIT

SYSTEM AND METHOD FOR PROFITABLE OPERATION OF AN UNLIMITED COMMUNICATIONS PLAN

RELATED APPLICATIONS

This application claims priority to U.S. Provisional Patent Application Ser. No. 61/650,331, filed May 22, 2012 and entitled "SYSTEM AND METHOD FOR PROFITABLE OPERATION OF AN UNLIMITED COMMUNICATIONS PLAN", the entire contents of which are incorporate herein by reference.

BACKGROUND

Electronic communications or communications, including but not limited to telecommunications, have been widely adopted into society. Communications service providers, such as telecommunications service providers, have created a wide variety of service plans that are marketed and sold to consumers, both public and private, over the years. Such service plans generally include an access agreement, typically monthly, and a usage based agreement. The usage component may include no included usage, limited included usage, and unlimited included usage. For example, when usage is billed, service plans have included charging customers or users on a usage or time basis, such as $0.10 per minute. Alternative service plans have used hybrid approaches, such as having a base service price that includes a certain amount of usage and variable rates for usage over the limit. One example of variable rates for usage may include varying rates for amounts of usage (e.g., differential prices for differential thresholds of usage). Still yet, other service plans provide for variable usage rates for calls during peak periods and unlimited usage during non-peak periods, such as nights and weekends. Some service plans provide unlimited calling to other customers on the same network or to certain telephone numbers. Another service plan that has been offered includes unlimited calling to anyone and anywhere for a fixed rate. The foregoing are merely some examples of the hundreds, if not thousands, of service plans that have been made available by communications services providers to consumers. These service plans may include usage paid in advance, pay as you go, or in arrears.

As communication services have expanded to include data services, communications service providers have offered a variety of service plans to support data services. The data services typically may include short message services (SMS) or text messaging, multimedia messaging services (MMS), Internet access, web browsing, multimedia streaming, data downloading and uploading (e.g., videos and movies), etc. The service plans vary in a similar manner as voice service plans with the addition of factoring in amount of bits, number of messages, data rates, network type (e.g., 3G, 4G, fiber, DSL etc.), and so forth. The communications services are inclusive of both mobile and non-mobile communications services, and wireless, satellite, fiber and wireline (landline) communications services.

As is often the case, with any business offer a certain portion of the population takes advantage of, or "game" the system, which tends to cause the business to be less profitable or potentially lose money. As an example in the communications industry, a service plan that offers unlimited calling is abused when a customer resells that unlimited calling feature to non-customers (e.g., neighbors who do not have a service plan with the communications service provider). Another possible form of abuse includes customers calling telephone numbers that require the carrier of a calling party to pay money to a terminating carrier that shares the revenue with the calling party. Another possible form of abuse are users who use the service in disproportionate amounts or for purposes for which the communications service in the service plan is not intended (e.g., as a baby monitor). These, and a variety of other abuses, cost communications service providers hundreds of millions of dollars every year. These costs result in significantly lower profitability as a whole for the communications service providers and deters communications providers from offering certain service plans. As such, there is a real problem that plagues the communications service industry with unauthorized or even abusive usage of communications services. For communications service providers that do not allow customers to pay for usage in arrears, these providers must be able to control, lessen, or prevent such charges or permit such charges to be debited from a pre-arranged account.

SUMMARY

To more profitably operate a communications service, the principles of the present invention provide for monitoring customer or user usage of the communications service and comparing the customer usage with the terms and conditions of or control relating to that service that limit usage of the communications service to prevent or limit further abuse. In one embodiment, the terms and conditions may limit service plans that provide for unlimited voice service to prevent a variety of different usages that have high costs to the communications service provider. In another embodiment, the terms and conditions may restrict the use of the communications services to certain permitted uses or prohibit certain other uses. In response to determining that a customer usage is in violation of the terms and conditions of the service plan, an action may be taken. By way of example, the action may include notifying the user of the violation of the terms and conditions (either by message, notice, intercept message, or otherwise), canceling or limiting the user's service, charging a pre-arranged account with funds, and/or removing a calling address (e.g., telephone number) from being accessible via a service feature. One such service feature may be an unlimited calling feature. By monitoring customer usage and comparing to the terms and conditions, the small percentage of users who abuse the system in ways that cause the communications service provider to be less profitable can be controlled or eliminated, thereby allowing for the communications service to be more profitable.

One method for profitably operating communications services may include providing a service plan inclusive of at least a portion of the communications services being unlimited for a user. A computing system may collect usage data of the user during a time period associated with the unlimited portion of the service plan. The computing system may determine whether the usage data is indicative of the user using the telecommunications services in violation of service terms and conditions associated with the unlimited portion of the service plan. The computing system may then perform an action in response to determining that the user is in violation of the terms and conditions. The usage data may include a variety of different types of usages information, including number of calls, number of outbound calls, number of international calls, duration of calls, number of text messages, amount of data downloaded, number and duration of calls to specific telephone numbers, number of unique numbers dialed, number of calls recorded from unique numbers (i.e., unique inbound calling party numbers), and so forth. In determining whether the usage data is indicative of the user violating the service provider's service terms and conditions, the computing system may aggregate usage data of at least a subset of users, compute at least one statistical metric from the aggregated usage data, and compare a user's usage data with a statistical metric threshold associated with the statistical metric(s). In one embodiment, the statistical metric is a standard deviation. The statistical threshold metric may be a predetermined percentage, such as 99 percent of a certain number of days out of a period, a certain number of consecutive periods, or multiples of a standard deviation. Another embodiment is that the usage is based on the total minutes in a selected period of time.

One method for operating communications services by a communications service provider may include providing a communications service plan by the communications service provider to a plurality of customers. Usage data of at least a subset of the customers over a time period may be collected by a computing system. The usage data of the at least a subset of the customers may be aggregated by the computing system. Statistics of the aggregated usage data may be computed by the computing system. A statistical threshold value as a function of the statistics of the aggregated usage data may be computed by the computing system. Usage data of a customer of the at least a subset of the customers may be accessed by the computing system. The usage data of that customer may be compared with the statistical threshold value by the computing system. A determination as to whether the usage data of that customer exceeds the statistical threshold value may be made by the computing system. In response to determining that the usage data of that customer exceeds the statistical threshold level, an identifier of that customer may be listed in an excessive usage report. Additional action(s) may be taken against that customer either automatically, by the computing system, or manually for usage that exceeds the statistical threshold level, such as communicating a notification of the excessive usage, taking charges from a pre-arranged account, suspending services, terminating services of the customer, and/or limiting access to certain services.

BRIEF DESCRIPTION

Illustrative embodiments of the present invention are described in detail below with reference to the attached drawing figures, which are incorporated by reference herein and wherein.

Figure 2:
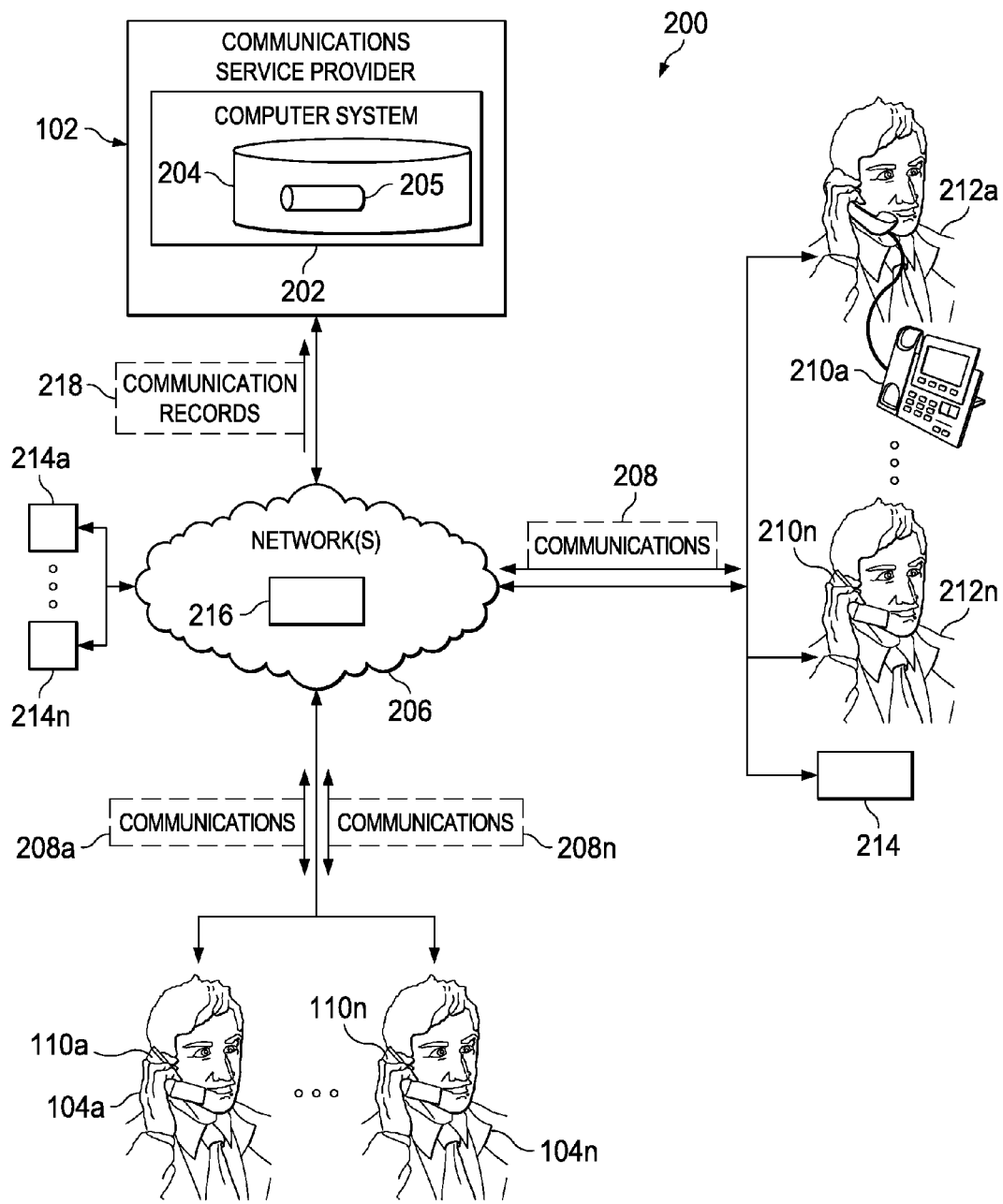
FIG. 2 is an illustration of the communications service provider of FIG. 1 that provides communications services to customers.
Figure 14:
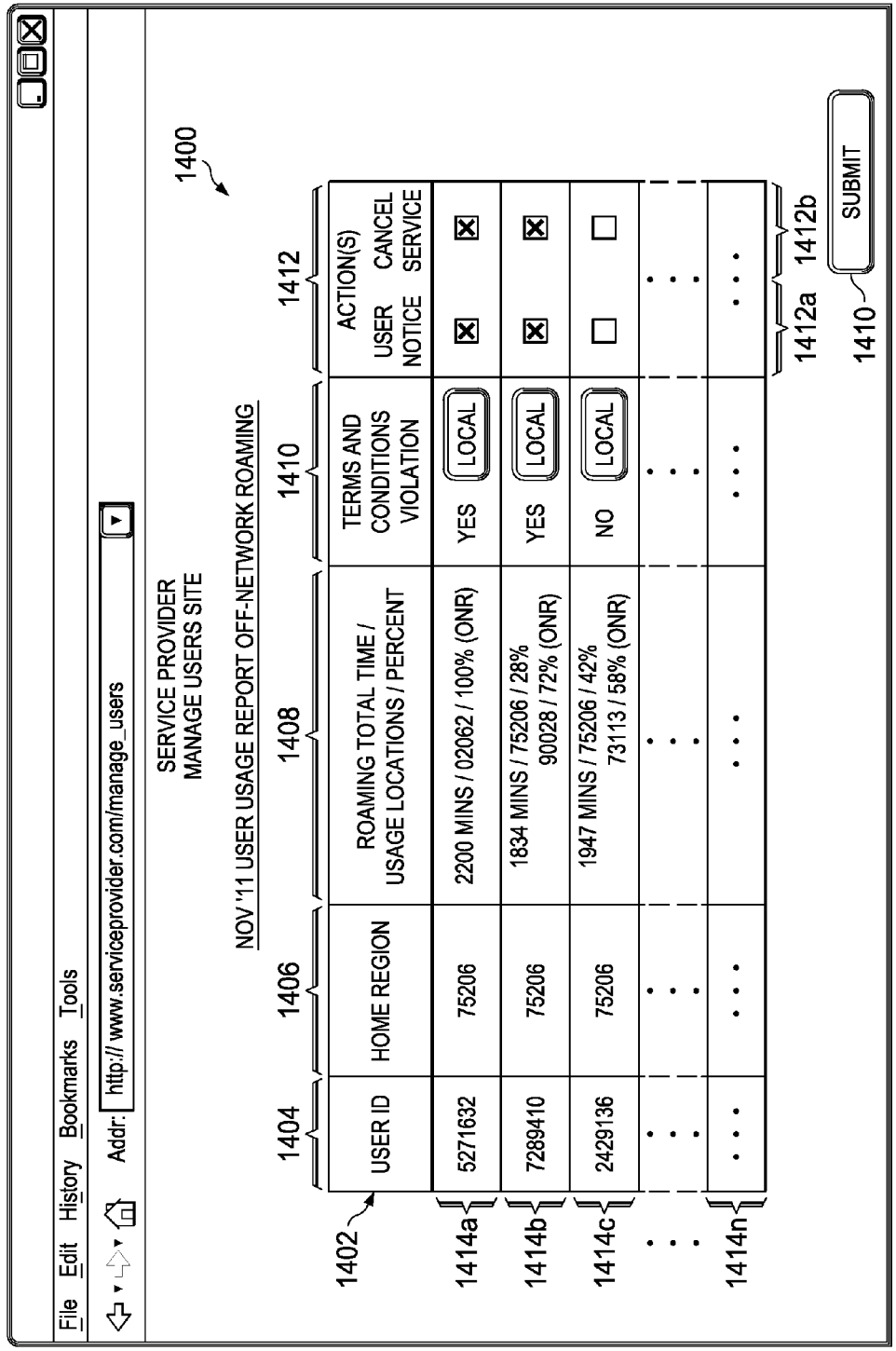
Figure 15:
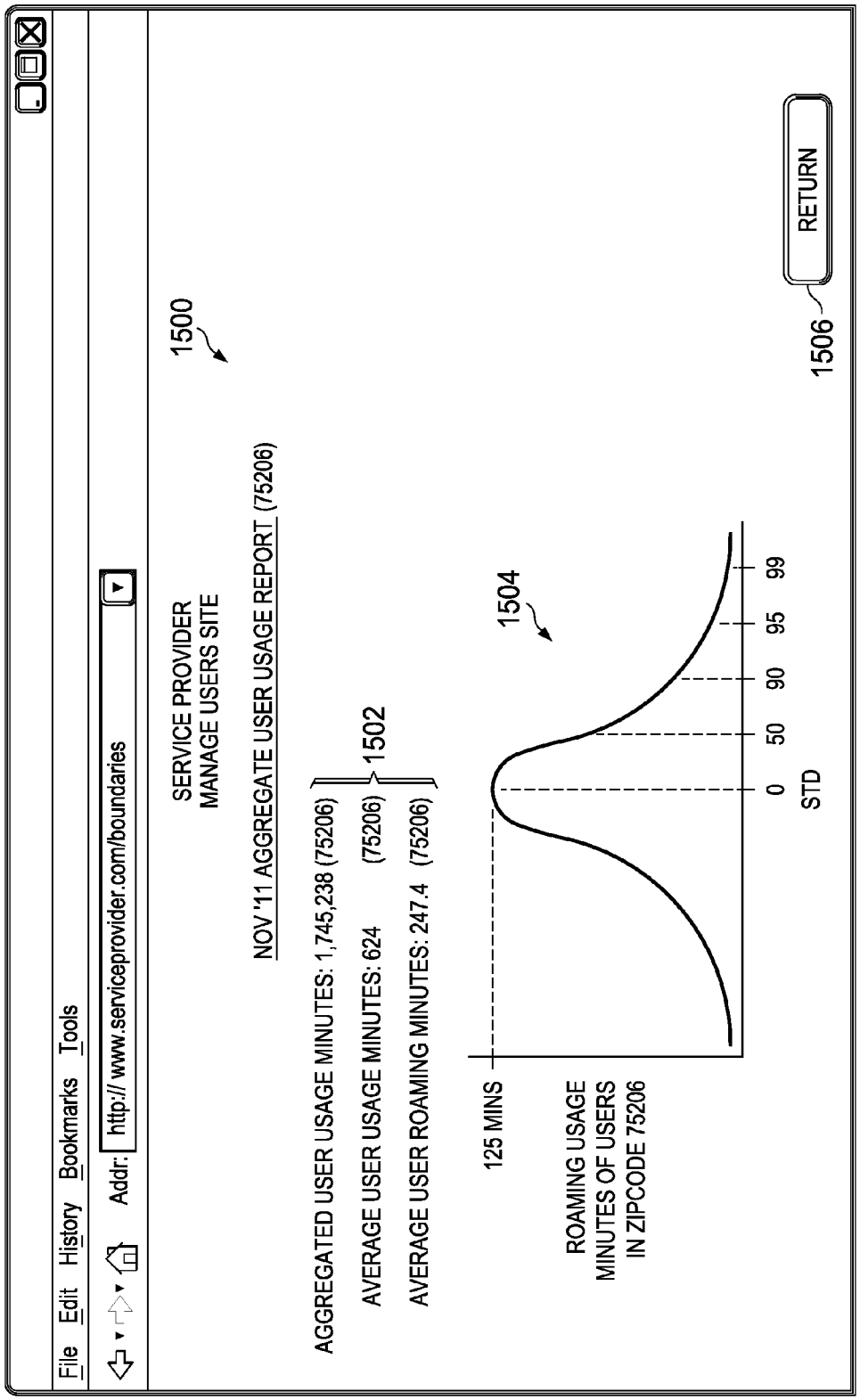
Figure 16:
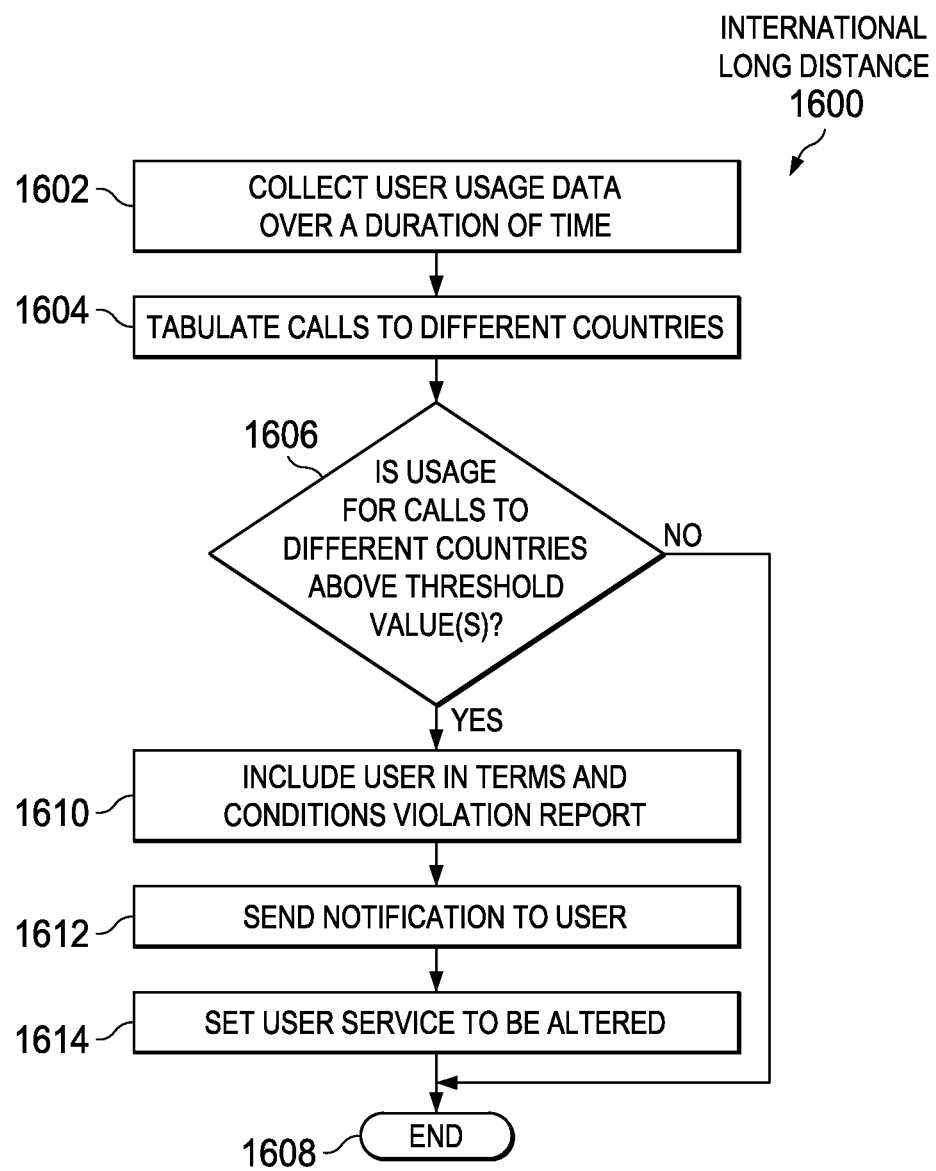
Figure 18:
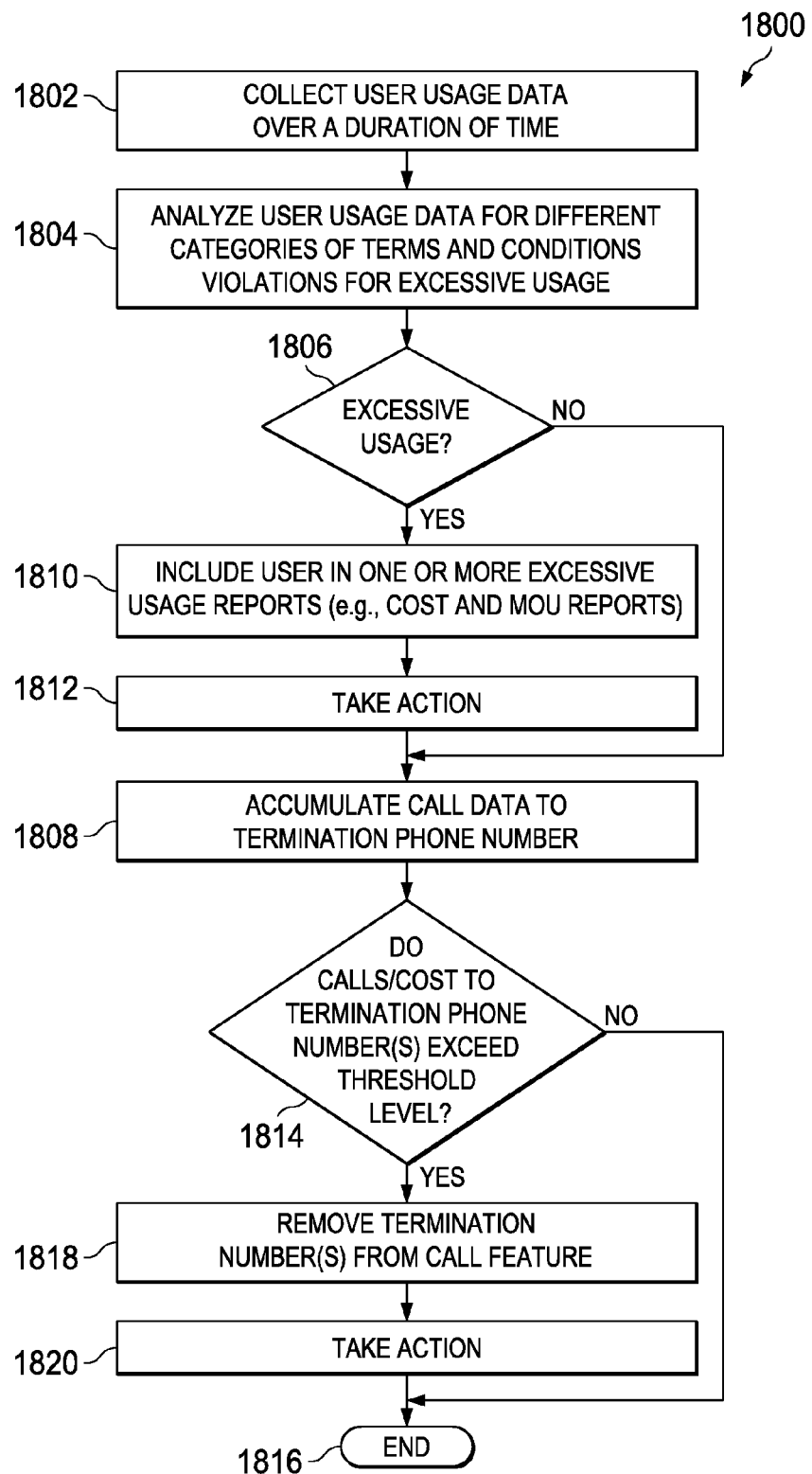
Figure 20:
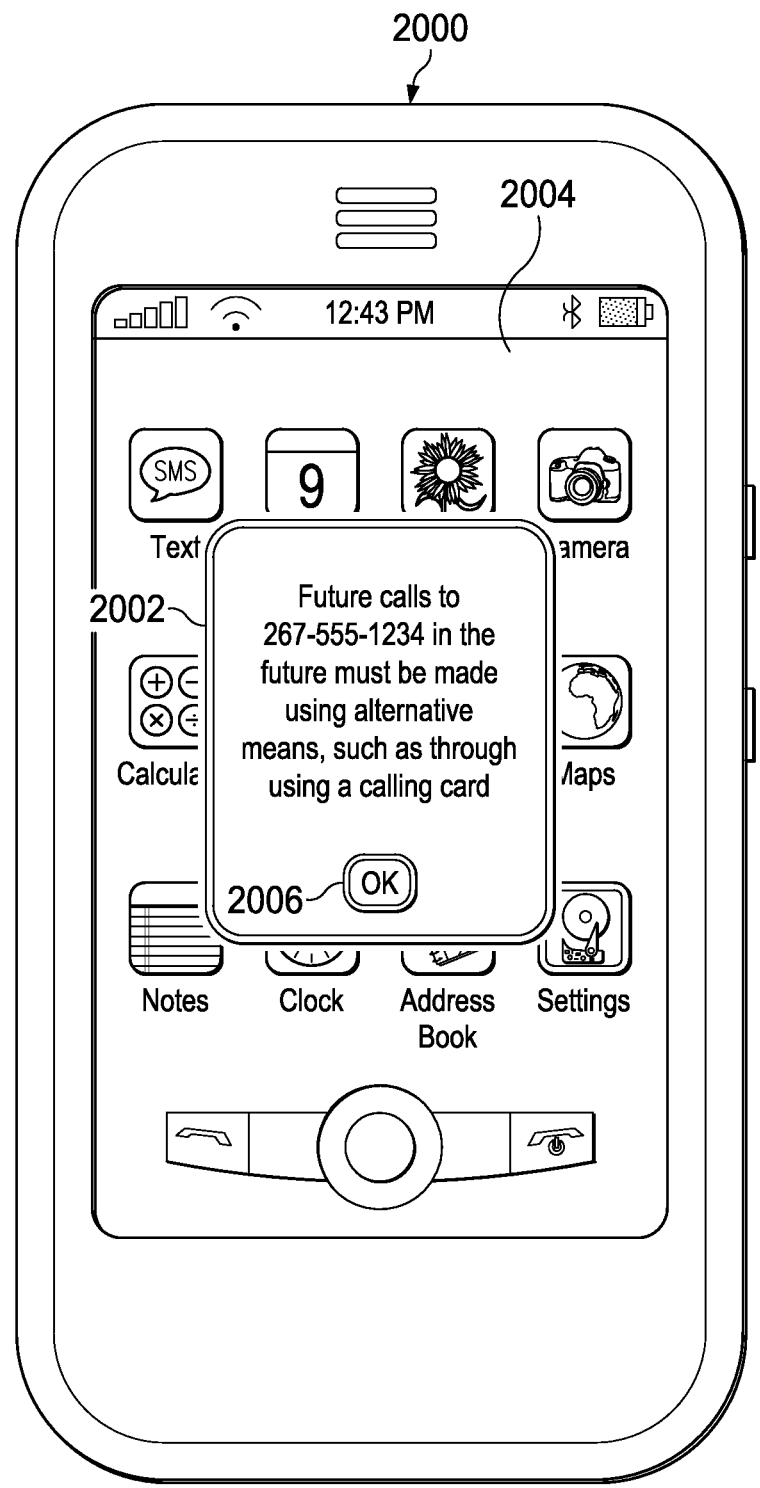
Figure 21:
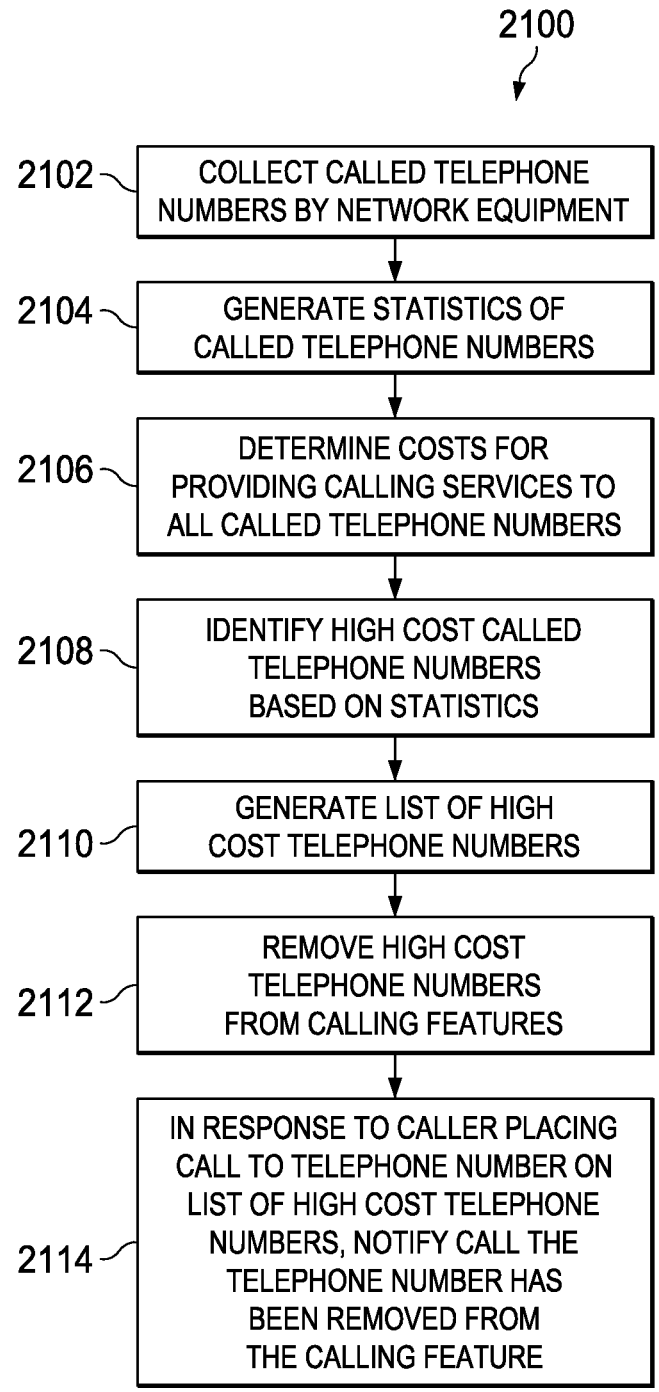
Figure 22:
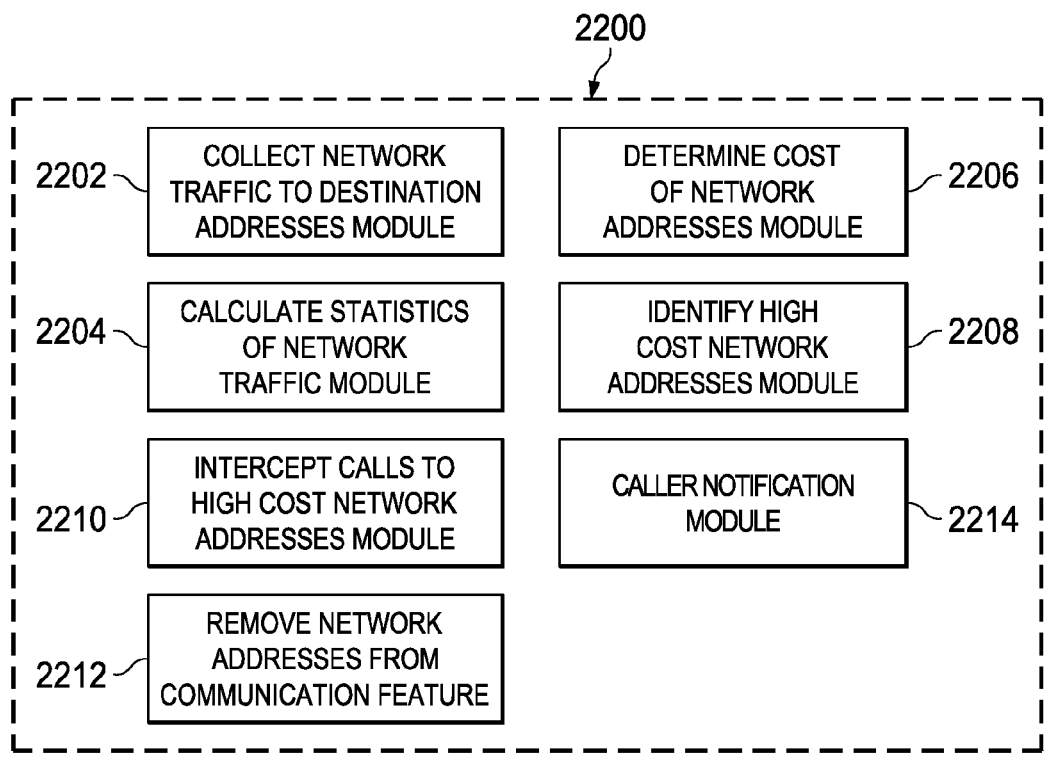

FIG. 14. is a screen shot of an illustrative user usage report for off-network roaming that allows for a communications service provider to send notices and/or cancel service to the user;

FIG. 15 is a screen shot of an illustrative user usage report that provides localized, aggregated user usage;

FIG. 16 is a flow diagram of an illustrative process for a communications service provider to generate a report of a user violating terms and conditions in placing international calls;

FIG. 17 is a screen shot of an illustrative international user report for a communications service provider to review and take appropriate actions against users who violate the terms and conditions;

FIG. 18 is a flow diagram of an illustrative process for a system to collect user usage data, determine whether excessive usage or calls placed to a particular termination number that violates terms and conditions of the service plan has occurred, and add the user to a report and/or remove termination number(s) for a call feature;

FIG. 19 is a screen shot of an illustrative excessive usage report that a communications service provider may use to identify excessive usage and initiate action to notify a user of the excessive usage and/or cancel service;

FIG. 20 is an illustration of an illustrative mobile device showing an illustrative message notifying user that a telephone number that he or she calls has been removed from a calling-feature and that future calls to the telephone number will have to be performed in an alternative manner;

FIG. 21 is a flow diagram of a process for a network analysis of high cost telephone numbers to be made to remove those telephone numbers from a calling feature; and FIG. 22 is a block diagram of illustrative software modules that may be executed on the network equipment and/or computing system of FIG. 2.

DETAILED DESCRIPTION

Service plans offered by the communications service providers to consumers are created in ways that encourage the people to become customers and allow the provider to profitably provide service. However, in offering the various service plans, a fundamental assumption by the communications service providers is that a profit can be made if customers or users "play by the rules." The rules are typically embodied by the communications service providers using contractual terms and conditions that are part of or associated with the service plan. These terms and conditions can be in the form of a signed agreement, electronically signed agreement, an agreement that is accepted upon receipt of service, or otherwise such as being simply associated with a particular feature of a communications service plan available on collateral or on a website. The terms and conditions generally provide limits for usage or behaviors by customers that, if violated, would cause the service plan(s) to be less profitable or lose money for a service provider. In addition, the terms and conditions may specify the intended uses of the service or certain uses that are prohibited. Carriers or communications service providers may also design their service plan(s) to limit calls to high cost numbers or usage of high cost services that drive up the cost to the carriers in providing the service as further described herein. It should be understood that the limitations provided by the terms and conditions are generally not intended to impact typical customers, but rather to prevent customers who intentionally attempt to abuse or "game" the system or to limit access to telephone numbers that might be unprofitable to serve.

While the principles of the present invention help in curbing abuse of communications services by customers, the system and functionality provided by the principles of the present invention also provide for controlling customer behavior in accordance with a service provider's business expectation for profitable operation of services. For example, a carrier may offer a feature that provides 1,000 minutes of use of a certain feature, such as voice calling. The carrier expects that service to be profitable if actual aggregated usage by customers is below 1,000 minutes. The carrier can prevent use above 1,000 minutes, but wants aggregated behavior to have usage below, or well below, 1,000 minutes of use. The principles of the present invention can be utilized to incentivize or control customer behavior to maximize or increase this kind of "breakage," as further described hereinbelow. It should be understood that the average number of minutes at which a communications service provider may profit may vary based on a number of factors, such as (i) charges from interexchange carriers with which the communications service provider engages, (ii) market rates and costs for delivering type(s) of service(s) offered by the communications service provider, and/or (iii) government regulations and/or price fixing by the government on the communications service provider, interexchange carriers, and/or other communications service providers with whom the communications service provider partners for providing roaming or other services to customers of the communications service provider. In other words, profitability in providing communications services may be determined based on rates that are averaged over multiple costs for delivering the communications services.

Figure 1:
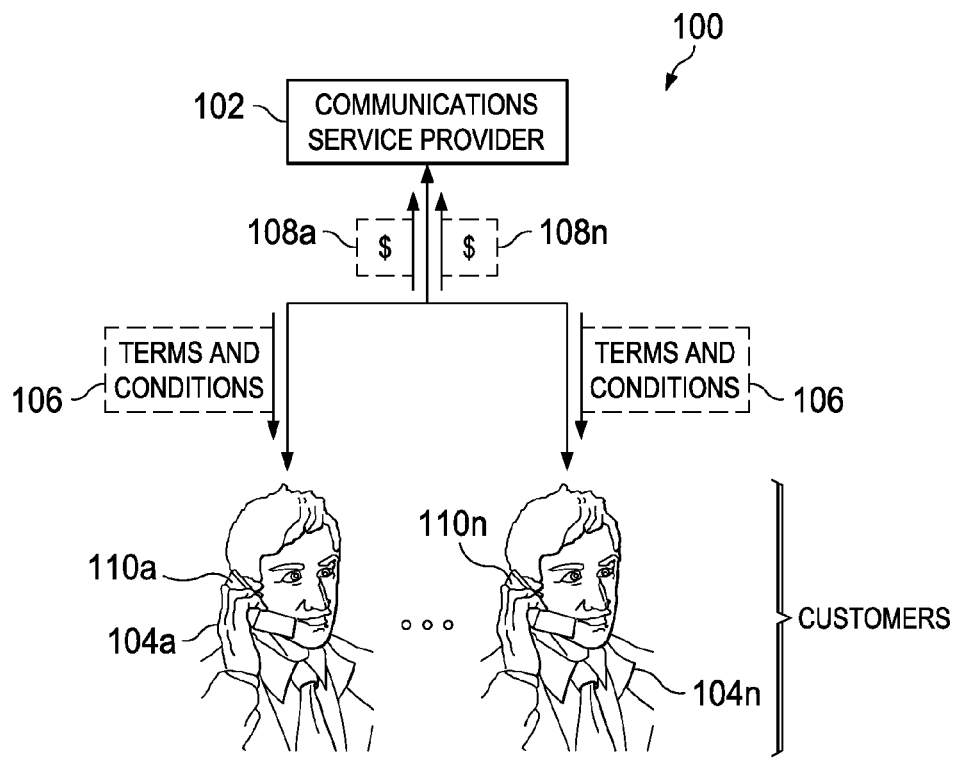
FIG. 1 is an illustration of an illustrative communications service provider environment in which communications services are provided by a communications service provider to customers under terms and conditions.

With regard to FIG. 1, an illustration of a network environment 100 in which a communications service provider 102 provides communication services to customers 104a-104n (collectively 104) is shown. The communications service provider 102 provides communications services to the customers 104 pursuant to terms and conditions 106, which operate to govern use of the communications services by the customers 104. Communications services may be any form of communications services, such as mobile or wireless, fixed (e.g., in-home or business data and/or wireline telephone services), gaming services, etc. As understood in the art, the terms and conditions 106 vary depending upon the types of communications service plans that the communications service provider 102 provides to the customers 104. For example, if the communications service provider 102 provides a service plan that includes unlimited minutes, then the terms and conditions 106 will provide a definition as to what "unlimited minutes" means. That is, "unlimited minutes" often has restrictions as to placing calls in a manner that creates abnormally or unreasonably high costs for the communications service provider 102. As understood in the art, unlimited usually does not mean unreasonable, and typically, but not necessarily, includes a "fair use" component. For example, the terms and conditions 106 may allow customers to place a certain number and/or duration of time of roaming calls during a given month, and, if the customer exceeds the number of and/or duration of time of roaming calls during the month, then the communications service provider 102 via the terms and conditions 106 may have the authority to limit, restrict, or cancel service of a customer. The terms and conditions might also limit the telephone numbers that a particular customer may call or receive calls in connection with an unlimited service.

In providing the communications services, the customers 104 pay the communications service provider money 108a-108n (collectively 108). Depending upon the service plan of the customers 104, the customers 104 may pay the money 108 to the communications service provider 102 in a prepaid, post-paid, or other manner, as understood in the art. The customers 104 may also establish a pre-arranged account, for example, from where charges can be drawn. The terms and conditions 106 may be communicated to the customers 104 via the communications service provider 102 in a variety of different ways, including having customers sign the terms and conditions 106 or other contract that are associated with the terms and conditions 106 prior to receiving communications services, providing the terms and conditions 106 via (i) an electronic communications, such as through an e-mail or SMS message, (ii) website screen, and so on, whereby the customer may or may not be required to acknowledge and/or accept the terms and conditions 106, or (iii) any other manner by which the communications service provider 102 may communicate the terms and conditions 106 to the customers 104. The customers 104 may sign or acknowledge the terms and conditions or accept the terms and conditions upon receipt of services.

With regard to FIG. 2, a network environment 200 shows the communications service provider 102 providing communications services to the customers 104, as provided in FIG. 1. The communications service provider 102 may operate a computing system 202, which may be a single computing system or be multiple computing systems being in communication with one another. The computing system 202 may be configured to operate or communicate with a storage unit 204 that stores one or more data repository 205. The storage unit 204 may be part of, proximate to, collocated with, or remote from the computing system 202. The data repository 205 may include a listing of information associated with the customers 104. For example, the information associated with the customers 104 may include name, contact information, service plan, and specific limitations or requirements provided in the service plan or terms and conditions associated with the service plan of the respective customers, or an account where pre-arranged charges can be satisfied.

It should be understood that the customers 104 may have different service plans. For example, customer 104a may have a communications service plan that provides for unlimited voice communications during nights and weekends while another customer 104n has communications service plan that provides for unlimited voice communications for all times during a day and week. Although the customers 104 are shown to have mobile devices 110, it should be understood that the communications service provider 102 may offer communications services for different types of electronic devices, including mobile telephones, smart telephones, tablet computers, data cards, gaming devices, texting devices, paging devices, fixed computing devices, including home computing devices, communications devices, or other customer premises equipment, televisions, and any other electronic device and communications protocols that customers may receive from a communications service provider. And, each type of communications device may have terms and conditions that are particular to the type of communications device and/or service plan offered by the communications service provider. In addition, certain services may not be permitted on certain service plans, such as texting, and permitted on other service plans.

As shown, the communications service provider 102 may have, or have access to, one or more communication networks 206 by which the communications service provider 102 provides communications services to the customers 104. The customers 104 may communicate electronic communications 208a-208n (collectively 208) via the network(s) 206 to communications devices 210a-210n (collectively 210) of users 212a-212n (collectively 212). The customers 104 may also send queries to receive data from, or send data to, various network equipment 214a-214n (collectively 214), such as web servers or mail servers. Although depicted as a single element, it could be understood that the network equipment 214 may include one or more pieces of equipment. The communications devices 210 may be conventional telephones, mobile telephones, smartphones, computers, gaming devices, and so forth by which the users 212 on devices 210 may communicate with, or provide information or data to, the customers 104.

The network(s) 206 may include communications equipment 216 that is used to route the communications 208 between the customers or users 104 and 212 and between users 104 and network equipment 214. Although depicted as a single element, it should be understood that the communications equipment 216 may include multiple pieces of equipment, which may include customer premises equipment, as understood in the art. In one embodiment, communications equipment 216 may be configured to collect communications records 218 of customers 104 of the communications service provider 102. In another embodiment, communications equipment 216 may limit access to certain telephone numbers or IP addresses and may provide intercept as other messages as notice to customers who dial or request access to certain telephone numbers or IP addresses. It is understood that IP addresses may include Internet protocol addresses, or any other form or way of directing non-traditional voice, such as voice over IP traffic or similar traffic, non-voice data, or traffic. The communications records 218 may include usage information. The usage information may include number of telephone calls, telephone numbers dialed, duration of telephone calls, number of international telephone calls, duration of international telephone calls, number of outbound calls, number of inbound calls, number of 3-way calls, duration of 3-way calls, number of text messages, calls to particular telephone numbers, number of off-net or roaming minutes used, cost of servicing the customers, Internet protocol addresses, and any other usage information, as understood in the art and as may be further described herein. The communications records 218 that are collected and/or generated by the communications equipment 216 may be communicated to the communications service provider 102 to storage unit 204 for storage in the data repository 205. Although shown as a single data repository, it should be understood that the data repository 205 may be formed of multiple data repositories that store information of the customers 104, such as the usage information or communications records 218, and may be accessed by multiple computer systems, including computer system 204. Data repository 205 may also include account balance information related to a pre-arranged account to be used to fund any usage in excess of included usage.

Figure 3:
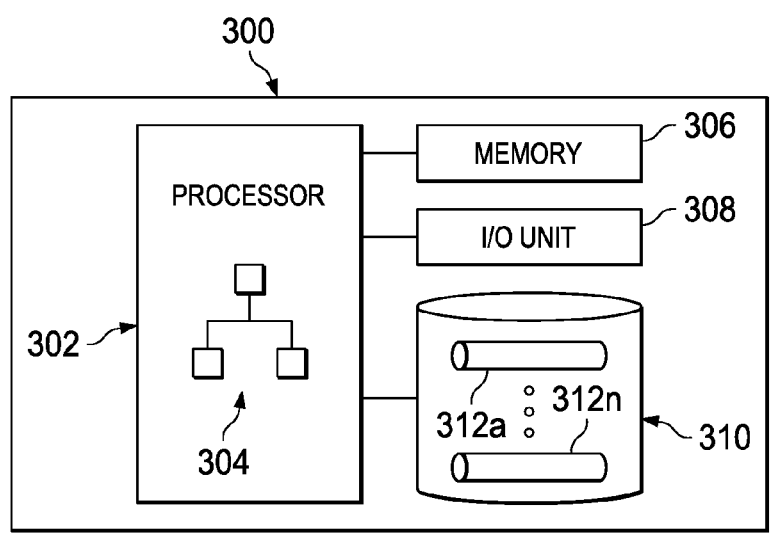
FIG. 3 is a block diagram of a computing system of the communications service provider of FIGS. 1 and 2 that performs customer management functionality in accordance with the principles of the present invention.

With regard FIG. 3, a block diagram of a computing system 300, such as a server, of a communications service provider is shown. The computing system 300 may include a processing unit 302 formed of one or more computer processors that operate to execute software 304. The software 304 may be configured to perform customer management functionality in accordance with the principles of the present invention. The processing unit 302 may be in communication with a memory 306 that may be configured to store software and data, such as customer usage data, input/output (I/O) unit 308 that may be configured to communicate data over a communications network, and storage unit 310, which may be configured to store one or more data repositories 312a-312n (collectively 312). The data repositories 312 may be configured to store usage data of customers, statistics data computed from the customer usage data, service plan data, and terms and conditions information, for example, to enable the communications service provider to monitor customer usage in both the aggregate and by individual in order to verify whether the customer is violating terms and conditions of the customer's service plan or to determine whether certain telephone numbers or IP addresses are being called or reached.

Figure 4:
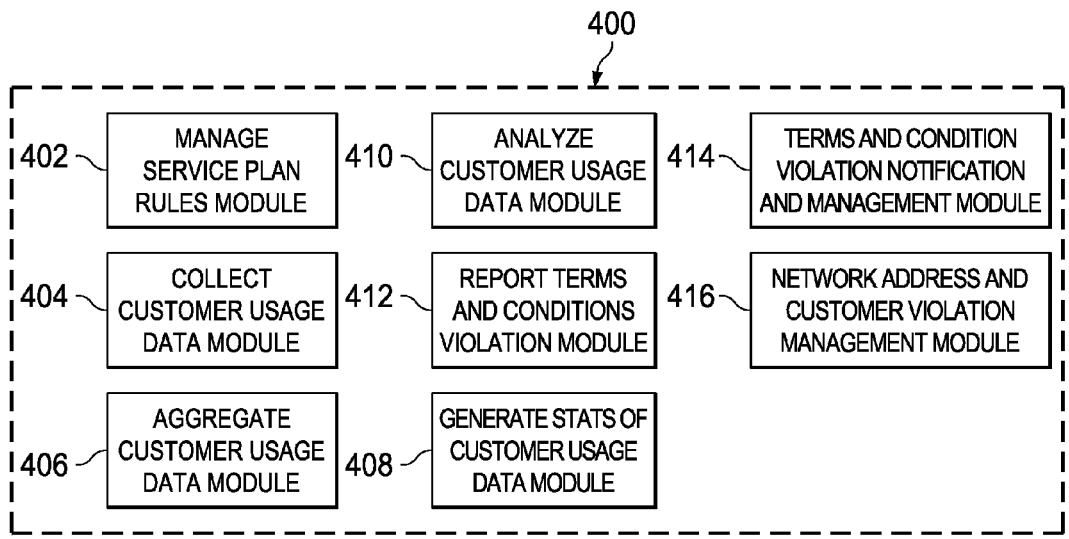
FIG. 4 is a block diagram of illustrative software modules executed by the computing system of FIG. 3 to perform and manage the customer management functionality in accordance with the principles of the present invention.

With regard to FIG. 4, a block diagram of illustrative software modules executed by the computing system of FIG. 3 is shown. The modules may include a manage service plan rules module 402 that is configured to store specific service plan rules for each of the customers with a service plan. In one embodiment, the module 402 may simply aggregate customers who have identical or similar service plans, as opposed to individually storing service plan rules associated with each individual customer. The module 402 may be configured to store specific service plan rules, such as number of minutes that customers have available during weekdays, weekends, nights, and so forth before entering into charges by the minute. As another example, the module 402 may be configured to manage a number of text messages that customers have before entering text message charges on a per message basis. As yet another example, the module 402 may be configured to store an amount of bits for data downloaded or streamed before entering a charge on a per megabyte basis, for example. In one embodiment, a service plan may provide for unlimited calls and data messages, so the module 402 may simply store that calls and text messages have no limit. Of course, as described herein, a limit may exist by way of the terms and conditions of the service plan set by the communications service provider.

A collect customer usage data module 404 may be configured to collect customer usage data as received by communications equipment in a communications network. The collect customer usage data module 404 may be configured to store a data record or multiple data records associated with each of the customers 104 of the communications service provider. The customer usage data may be stored in a customer data record. In one embodiment, because a service plan has specific usage parameters, such as number of calls, number of international calls, time of calls, length of calls, number of data messages, amount of data, and so forth, each of those usage parameters may be stored in association with each of the customers 104 of the communications service provider. Furthermore, the service plan rules stored by the module 402 may have parameters that the customer usage data module 404 may use to store parameters and data created by the customers 104 and/or generated by the computing system 300 of FIG. 3. The collect customer usage data module 404 may be configured to collect the customer usage data over a time period, such as a monthly time period, and also store historical customer usage data, such as over a customer's 104a lifetime of being a customer 104a of the communications service provider.

An aggregate customer usage data module 406 may be configured to aggregate customer usage of a subset or all customers of a communications service provider. By aggregating a subset or all customer usage data, the communications service provider may be able to identify individuals who impose abnormally or unreasonably high metrics or are abusers of one or more service plans provided to customers of the communications service provider. Such aggregation allows for identification of abusers. A subset may be customers of a certain geographic region (e.g., a particular geopolitical area, such as a zip code, border region of a service area footprint, or other geographically defined region), demographic (e.g., females between 18 and 22 years old), or otherwise. A customer may be considered an abuser if the customer violates terms and conditions of the customer's service plan. One way to identify a violation of terms and conditions of a service plan is to compare a customer's usage against a subset or all of the customers of the communications service provider, as further described herein. In another embodiment, the usage data is aggregated to identify certain high usage telephone numbers, destinations, or addresses. By aggregating data together with price information, the communications provider can limit access to high cost numbers. And, by excluding access to high-cost numbers, customers may be prevented from attempting to participate in behavior that results in the carrier from being profitable. In one embodiment, the module 406, or any other module, may generate or utilize aggregated rate averaging to determine abusers of the system. As an example, because rate plans tend to vary over time, the same rate plan may be slightly different for different customers. As such, in determining abusers, the rate plans for an aggregate number of all or a subset of customers may be averaged. Similarly, cost structure for determining cost of customers may use an aggregate averaging model for determining an average cost for delivering services for all or a subset of customers.

A generate statistics of customer usage data module 408 may be configured to access aggregated customer usage data, as created by module 406, and to generate statistics based on that customer usage data. These statistics may include averaging one or more parameters of the customer usage data. For example, average number of telephone calls placed by customers in a 24-hour period may be one data parameter that the module 408 calculates. As another example, an average number of international calls placed by customers over a given time period, such as a month, may be calculated. On another example, customer calls to a single telephone number destination or address can be identified as potential abusive telephone numbers. Rather than simply determining the average of the various customer usage parameters, alternative statistical data may be generated, such as medium, maximum, and any other statistical information, may be generated to enable the communications service provider to identify violators of terms and conditions of a service plan. The module 408 may further be configured to generate statistics, such as standard deviation, Gaussian curves, and any other statistical information on an aggregated basis so that individual customer usage data may be compared against those statistics associated with a subset or all customers of the communications service provider.

In addition to the module 408 being configured to generate or compute aggregated statistics of the customers of the communications service provider, the module 408 may be configured to generate statistics of an individual customer of the communications service provider. The statistics of individual customers of the communications service provider may include totals of customer information over a time period (e.g., hourly, daily, weekly, monthly, annually, or any other time period that the service provider chooses), such as total time of telephone calls placed by a customer, total number of calls over a 24-hour period, average number of calls placed over each 24-hour period, over each week, and so forth. The aggregated and/or statistical data determined from a customer's usage data may be compared to the aggregated customer usage information of the subset or all customers of the communications service provider, as further described herein.

An analyze customer usage data module 410 may be configured to access the statistics generated from the aggregated customer history information (e.g., statistics of all or a subset of the customers of the communications service provider) and usage totals or statistics generated from an individual customer of the communications service provider. The module 410 may compare the usage of an individual customer with the statistics of an aggregated set of customers of the communications service provider in order to determine whether the individual customer has usage that is abnormal as compared to an aggregate of customers. In terms of being abnormal, the module may determine whether the statistics of the individual customer exceeds an aggregated or statistical threshold of one or more usage parameters. For example, the module 410 may determine that the individual customer's call usage is beyond a standard deviation threshold of an aggregate of customers for a particular usage parameter. The standard deviation threshold may be specified by the communications service provider to be any value that may identify a customer as violating his or her terms and conditions of a service plan. For example, the standard deviation threshold may be set at 98% (98 percent) of all customers. If a customer exceeds that standard deviation threshold for a particular usage parameter, such as number of minutes of calls per day, per week, or per month, for example, then the module 410 may identify the user as being a potential violator of his or her terms and conditions. In one embodiment, the module 410 may identify that the user or customer is a potential violator of his or her terms and condition and communicate a request to an employee of the communications service provider to allow the employee to make a final adjudication as to whether the customer is a violator. In making the final adjudication, the module 410 may be configured to receive a response from the employee as to the decision. In another embodiment, the module 410 may check whether sufficient funds are available from a pre-arranged account or verify alternative payment mechanism, such as a credit card, is established and available for charges not included and module 410 then would request payment.

A report terms and conditions violation module 412 may be configured to access data generated by the module 410, such as identification of customers who have exceeded a standard deviation threshold for one or more customer usage parameters, and generate a report of those violators. In one embodiment, the module 412 may simply set a flag for particular usage parameter(s) that customers of the communications service provider have violated. In one embodiment, a customer may be identified as violating numbers of calls in a 24-hour time period, but not violating length of calls made during that 24-hour time period if the number of calls made are relatively short. In such a case, the customer may be placed onto a report for customers who place a total numbers of calls that are above a standard deviation threshold, while another report may show customers who place long distance calls or international calls, for example, that exceed a certain threshold, such as standard deviation threshold or otherwise. The module 412 may be configured to automatically place customers who are determined to violate terms and conditions and/or notify a user (e.g., employee of the communications service provider) of a potential violation and allow the user to actively or manually select the customer to be placed on the report. The report may be created by placing certain data, such as customer identifier, name, and any other information associated with a customer onto a special report. Alternatively, the report may be generated by placing a reference of a customer (e.g., pointer or identifier to a record in a database) into a report and the report may be populated thereafter with actual data of the customer.

A terms and conditions violation notification and management module 414 may be configured to automatically, semi-automatically, or manually enable a communications service provider to notify a customer who has been determined to violate terms and conditions of his or her service plan of the violation. The module 414 may be configured to send an electronic communication to the customer of the violation or suspected violation to provide a warning to the customer that continued violation may cause cancellation of his or her service. Alternatively, the notification may be in the form of paper by a computing system creating a letter, which the communications service provider may mail to the customer of the suspected or determined violation of terms and conditions of the service plan. In one embodiment, rather than creating a separate notification, a standard statement may have a warning placed onto the statement of the suspected violation of the terms and conditions. The warning or notice of the violation of the terms and conditions may include notifying the customer that a particular usage parameter has resulted in a violation of a particular clause or paragraph in terms and conditions of the service plan. The module 414 may further be configured to manage notifications, such as historical notifications to each of the customers who have been deemed to violate the terms and conditions, so that the communications service provider may review the historical notifications to determine whether a customer has violated the terms and conditions multiple times, such as three times, thereby providing justification to suspend, cancel, or otherwise terminate a customer from his or her service plan.

A network address customer violation management module 416 may be configured to track network addresses or telephone numbers that cause excessive costs to the communications service provider. Traffic pumping or access stimulation is a practice by which some local exchange carriers in rural or other areas of the United States inflate numbers of incoming calls to their networks so as to receive inter-carrier compensation fees to which the local exchange carriers are due as prescribed by the Telecommunications Act of 1996. Pursuant to the Telecommunications Act, rural carriers are allowed to charge substantially higher access fees than carriers in urban areas. The rural carriers partner with telephone service providers, such as conference call service providers, to route calls through the rural carriers. The telephone service providers involved with traffic pumping tend to set up one or more telephone numbers or network address to which calls from outside the rural carrier communicate either via telephone calls or data communications. Communications service providers whose customers use the services of the telephone service providers who have teamed with the rural carriers are thereby required to pay the rural carriers under the Telecommunications Act. Due to the financial arbitrage, services are provided free to end users, but at substantial cost to communications service providers. The rural carriers share the revenues through the increased call volume with the telephone service providers. The additional revenue to the rural carriers result in millions, if not hundreds of millions, of dollars.

A network address may result in excessive fees for a communications service provider if the network address terminates with a termination carrier that shares revenue with calling parties and requires the communications service provider to pay for the termination charges, as previously described. The module 416 may further be configured to manage network addresses and customer violations associated with those network addresses so as to remove network addresses from calling features, such as an unlimited calling feature, thereby reducing abuse created by customers in calling those network addresses. The module 416 may monitor total numbers and/or durations of calls or communications by one or more customers to a network address to identify that the network address is being used in an abusive manner. Alternatively, the module 416 may track costs associated with a network address to identify that the network address is being used in an abusive manner (e.g., in a manner that violates terms and conditions of a service plan). As previously described, the communications service provider may monitor costs of customers in excess of average cost for servicing and/or price for services for customers who place calls to a network address. That is, the communications service provider may determine that a customer is an abuser if the costs for servicing the customer are excessive based on cost for servicing an average customer, such as an average customer on a local or global basis. Still yet, the average customer may be an average customer who communicates with a particular network address.

Figure 5:
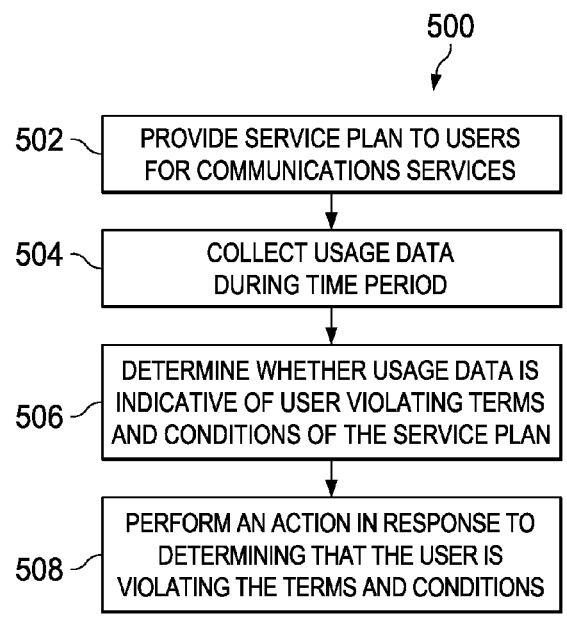
FIG. 5 is a flow diagram of an illustrative process for monitoring for violation of terms and conditions of a communications service plan by customer.

With regard to FIG. 5, a flow chart of an illustrative process 500 for monitoring a user for violation of terms and conditions of a communications service plan is shown. The process 500 starts at step 502, where a service plan may be provided to users by a communications service provider for communications services. The communications services may be any communications services, such as (i) communications services for mobile devices, such as mobile telephones, smart-phones, computers, and mobile gaming devices, (ii) Internet communications services, and (iii) any other communications services that may be governed by terms and conditions that are associated with the communications services and service plan. The service plan may be a prepaid, post-paid, or any other payment schedule service plan. In one embodiment, the service plan may provide for unlimited communications services, where it has been found by communications service providers that a fair amount of abuse of the communications services have been conducted by a small population of customers. Because unlimited services allow for customers to make unlimited communications, such as telephone calls or data downloads, it has been found that some customers share their services with non-customers, thereby abusing the unlimited services and costing the communications service provider expenses that are not accounted for when creating the service plan.

At step 504, usage data is collected during a time period. The usage data may include a wide variety of usage, including voice calls, data downloads, text messages, number of phone calls, number of international phone calls, number of calls or duration of calls to particular telephone numbers, and so on. It should be understood that the usage data may include a wide variety of parameters that have costs associated with that usage that a communications service provider may track to monitor service costs. The usage data collected may be collected for all or a subset of customers of the communications service provider. By collecting usage data for at least a subset of customers, the communications service provider may be able to generate statistics to assist the communications service provider to determine whether a particular or individual customer significantly deviates from typical or average customers, as provided herein.

At step 506, a determination may be made as to whether usage data is indicative of a user violating terms and conditions of the service plan. The determination may be performed in a manual, semi-automatic, or automatic manner by a computing system and/or user of the computing system of the communications service provider. The terms and conditions may have particular terms that may be determined to be violated through use of the services by the customer. For example, the terms and conditions may specify that customers are required to live within a service area provided by a communications service provider. With prepaid, unlimited service plans, customers who do not live within a service area of the communications service provider often obtain services through falsifying their home addresses so as to be able to obtain services from the communications service provider. Such a home address falsification may violate the terms and conditions of the communications service provider because if the customer uses the communications services while in their actual residence that is outside the service coverage area of the communications service provider, large roaming charges may result and, as a result of the service plan being prepaid and unlimited, the communications service provider has to absorb the roaming charges generated by the customer. Another example is a customer using this service in ways that it was not intended. It should be understood that the roaming charges are a single example of violating terms and conditions, and that a wide variety of violations may be detected or determined based on usage by the customers.

It should be understood that in making the determination at step 506, that violation of one or multiple usage parameters and/or terms and conditions may be considered. For example, a determination may consider whether minutes of use, number of calls, number of long distance calls, number of roaming minutes, number of roaming calls, and so forth may be considered. If multiple usage parameters and/or terms and conditions are considered, then if the customer violates one usage parameter, then a first action may be taken (e.g., warning issued to the customer). If, however, multiple usage parameters and/or terms and conditions are violated, then a second action may be taken (e.g., discontinued service for the customer).

At step 508, an action may be performed in response to determining that the user is violating the terms and conditions of the service plan. The action may include generating a report listing a customer who is determined to be violating the terms and conditions, generating and communicating a message, such as a warning or notification message, to the customer and/or suspending or canceling the service of the customer. The action may be performed manually, semi-automatically, and automatically, as further described herein. It should be understood that the response may not be an immediate response, but rather may allow for a committee, individual, or otherwise to review the usage data and any statistical data derived from the usage data of a customer as compared to statistical data of at least a portion of usage of other customers of the communications service provider. Alternatively, rather than basing the action on a comparison of the usage of the customer, fixed threshold levels, such as a total number of minutes (e.g., over 20 hours in a 24-hour time period), may be set to identify that the customer is violating the terms and conditions.

Figure 6:
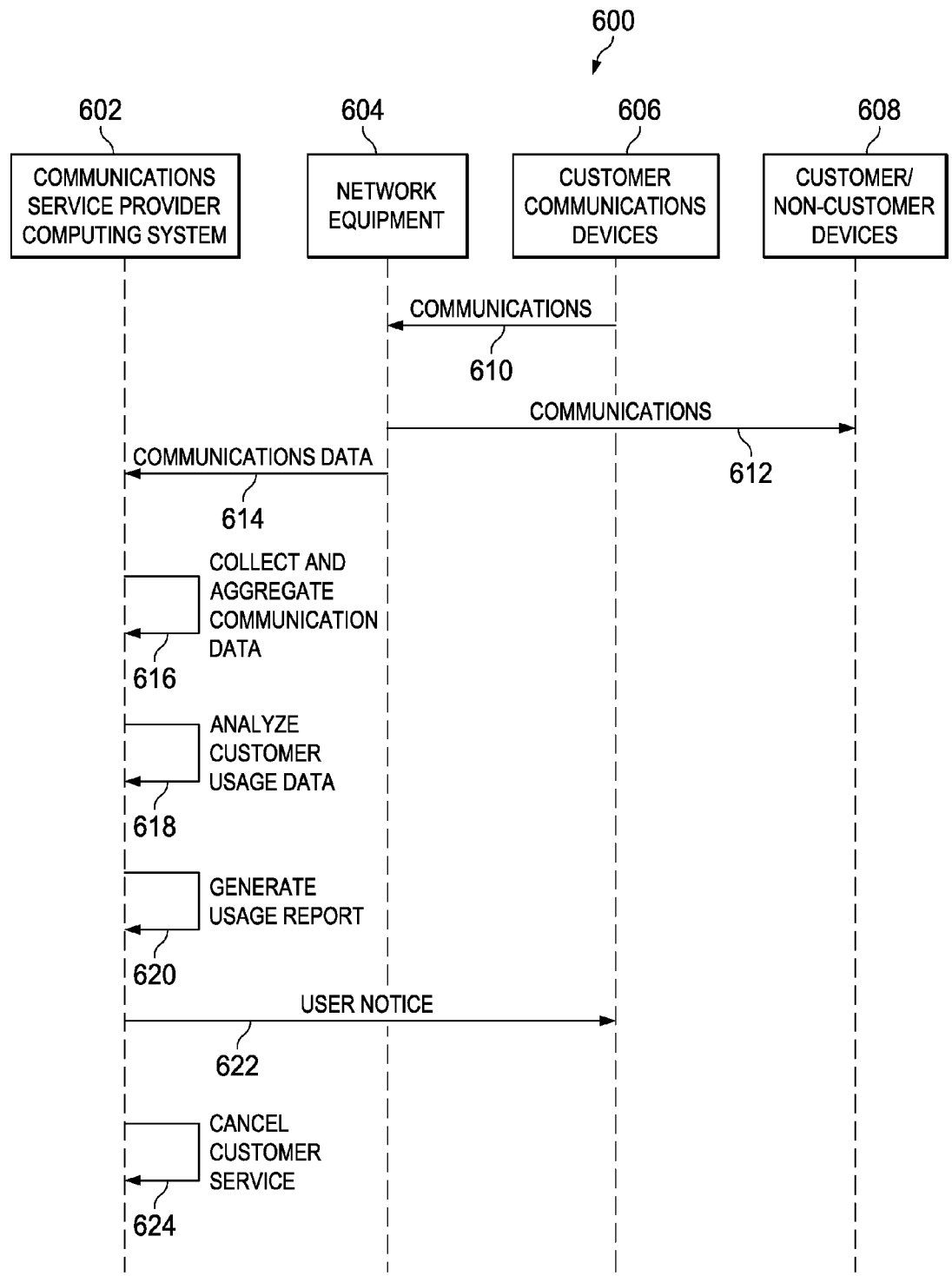
FIG. 6 is an interaction diagram showing user usage of communications services and monitoring for violation of terms and conditions by the user.

With regard to FIG. 6, an interaction diagram of an illustrative process 600 for monitoring for violations by a user of terms and conditions of a communications service plan is shown. The process 600 may include a number of different devices and systems used to perform the process 600, including a communications service provider computing system 602, network equipment 604, customer communications devices 606, and customer and non-customer communications devices 608.

The process 600 may start at step 610, where communications by customers using their customer communications devices 606 are made, the communications 610 may be routed through the network equipment 604 as communications 612 to other customer and non-customer communications devices 608. The network equipment 604 may provide communications data 614 associated with the customer communications devices 606 to the communications service provider computing system 602. The communications data 614 may include a wide variety of communications data, including number of calls placed, number of calls placed to international destinations, destinations or telephone number called, number of calls placed to particular network addresses, number of data messages communicated, amount of data downloaded, amount of roaming calls or communications made, and so forth. The communications service provider computing system 602 may store the communications data in association with each of the individual customers with which the communications data is associated as well as store statistics and aggregated communications data, as performed at step 616.

At step 618, the customer usage data may be analyzed. In analyzing the customer usage data, the data may be analyzed based on statistics created from individual customer data and/or aggregated customer data. For example, an average number of minutes from at least a subset of the customers of the communications service provider may be determined and individual customer usage data, as compared to the aggregated customer usage data over a time period, such as a month, may be compared. In one embodiment, a standard deviation may be generated based on the aggregated customer data so as to identify customers who may be violating terms and conditions of a service plan of the communications service provider. As previously described, multiple customer usage data parameters (e.g., minutes of use, number of roaming calls, etc.) may be analyzed and used to determine whether a customer is violating one or more terms and conditions.

At step 620, a usage report may be generated with all or a portion of customer usage. In one embodiment, the usage report may list customers who are suspected of violating the terms and conditions as a result of step 618. The usage report may be electronic, as produced by a computing system, and be in the format of a spreadsheet, table, message, or otherwise. At step 622, a user notice may be communicated to one or more customer communications devices 606. The user notice may be a notice that the user or customer is violating his or her terms and conditions of the service plan and that continued violation may result in termination or suspension of services being provided to the customer. In one embodiment, the user notice is communicated at step 622 in response to a user or operator of the communications service provider initiating an action to cause the user notice to be communicated. Alternatively, the user notice may be communicated automatically in response to a determination being made by the communications service provider computing system 602 that the user is violating the terms and conditions of the service plan. At step 624, the communications service provider computing system 602 may cancel the customer service for a customer who is violating the terms and conditions. In one embodiment, cancellation may mean suspension, termination, or other disciplinary action being taken against a customer. The cancellation may be made immediately, after notice is communicated to the customer, or otherwise as desired by the communications service provider. The communications service provider may also provide an internet message to the customer if they attempt a call from the communications provider's computing system 602.

Figure 7:
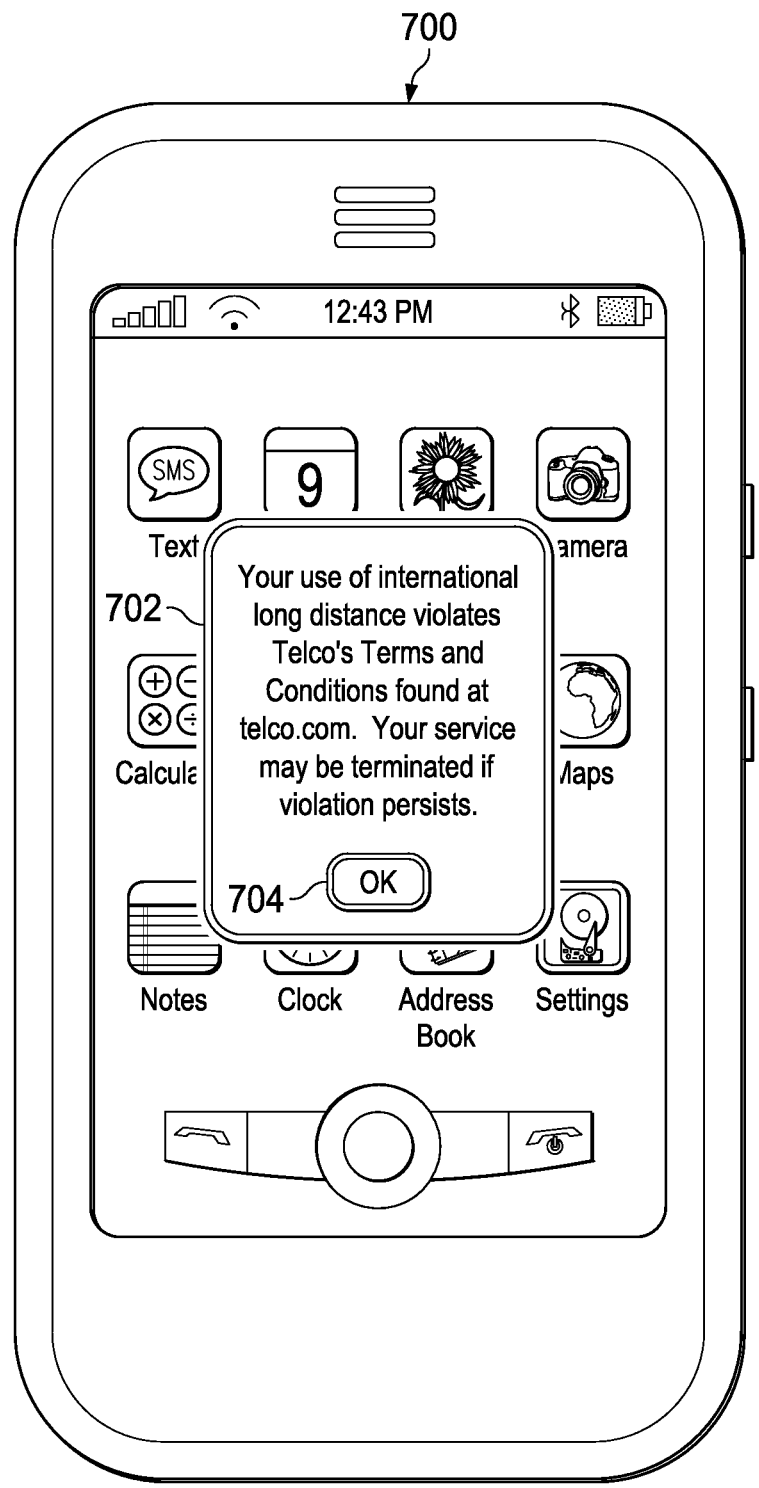
FIG. 7 is a screen shot of an illustrative message communicated to a user of a mobile device of a violation of terms and conditions of the service plan.

With regard to FIG. 7, an illustration of an illustrative mobile device 700 displaying an illustrative message 702 of a violation of terms and conditions of a service plan is shown. The message 702 include a generic message and may specify a specific term of the terms and conditions that the user or customer is violating. As shown, the message is indicating that the user is violating international long distance calling terms and conditions and, optionally, provide a link for the user to view the terms and conditions that are being violated. In one embodiment, the message may list a usage parameter and the amount of usage that caused the message to be triggered (e.g., "You made 1,423 international calls this month."). The message may be a text message that is automatically displayed on the mobile device 700 to ensure that the customer cannot avoid seeing the message. In an alternative embodiment, the message may be in the form of an e-mail to the customer. Still yet, the message may be communicated via a "robo call," where a computer calls the mobile device 700 and provides a voice message to the customer. Other forms of communication of messages may be utilized, including a human call or letter, optionally in a monthly bill, to the customer. The message 702 may include a soft-button 704 that the customer may press after viewing the message to cause the message to be removed from the display of the mobile device 700. Finally, in another embodiment, any time a customer tries to use his or her phone he or she may get the message delivered by the system.

Figure 8:
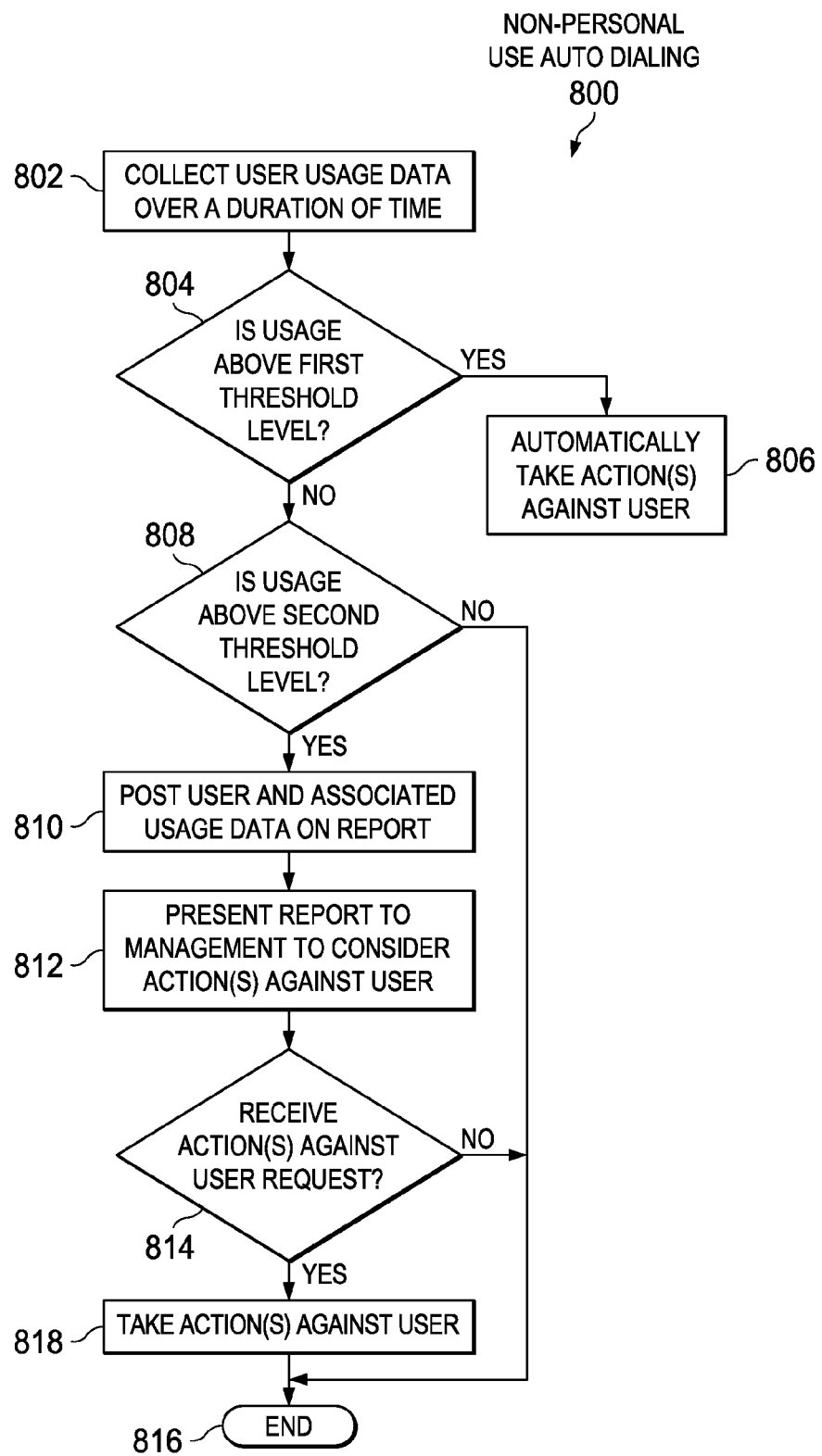
FIG. 8 is a flow diagram of an illustrative process for monitoring and reporting that a user is violating terms and conditions of a service plan.

With regard to FIG. 8, a flow diagram of an illustrative process 800 for monitoring and reporting that a user is violating terms and conditions of a service plan is shown. The process 800 may start at step 802, where user usage data is collected over a duration of time. The duration of time may be a day, a week, a month, or otherwise. At step 804, a determination may be made as to whether usage is above a first threshold level. In one embodiment, the threshold level may be a threshold number of telephone calls, numbers of messages, amount of data, and so forth depending upon a type of usage or usage parameter that is being analyzed. If the answer of the determination at step 804 is yes (i.e., that the user usage is above the first threshold level), then at step 806, the process 800 may automatically take one or more actions against the user. The actions may be in the form of including the user on a report, communicating a message to the user, and/or affecting services being provided to the user, such as suspending, limiting, cancelling, or otherwise of the services. The first threshold level may be a standard deviation level that indicates that the user is clearly violating terms and conditions, such as being in a 99th percentile of all users or all users in a particular geographic area, such as a border region of a service area of the communications service provider.

If the usage is determined not to be above a first threshold level at step 804, then the process continues at step 808, where a determination is made whether the usage is above a second threshold level. In one embodiment, the second threshold level is lower than the first threshold level, thereby simply indicating that the user has suspicious usage, but not necessarily usage that violates terms and conditions, as approaching the limit, but not over it. For example, the second usage level may be at a standard deviation that indicates that the user is above 95% of all other users or users local to that particular user. If the answer is at step 808 is "yes" (i.e., that the usage is above the second threshold level), then at step 810, user information and associated usage data may be posted on a report of the communications service provider. The report may be one that lists users who have suspicious activity, but not necessarily activity that is a clear violation of terms and conditions of a service plan, as would have been created if the user had usage above the first threshold level. At step 812, the report may be presented to management or other user of the communications service provider to consider one or more actions to be taken against the user. The one or more actions may include sending a notice to the user, maintaining the user on a watch list, and/or affecting service being provided to the user.

In one embodiment, the notification may provide a notice that the customer has a certain time period to cure the violation. If a cure period is offered to the customer, the communications service provider may monitor the customer usage over a certain time period (e.g., over the next week or next month). If the customer has cured the violation behavior, then the customer may remain on a watch list for a certain time period to ensure that the customer does not continue with the previously identified behavior that violates terms and conditions. Alternatively, the customer may be removed from a watch list, but have the notification remain in his or her records. If the customer does not correct his or her behavior, then the customer may have his or her services altered (e.g., termination of services). By providing multiple threshold levels, customers who violate the terms and conditions may have the ability to cure their behavior or resolve the situation with the communications service provider without having their communications services canceled. Although the process 800 shows two threshold levels, it should be understood that one, two, or more than two threshold levels may be utilized.

At step 814, one or more action request(s) against a user may be received. The action request(s) may include an action request to a computing system of the communications service provider to initiate an action. For example, if a report provides a user with the ability to select a soft-button to initiate an action, then the computing system may receive an action request via a graphical user interface that displays the report. If no action requests are received, then the process continues at step 816 where the process ends. Alternatively, if an action request is received, then the process continues at step 818, where one or more actions may be taken against the user who has usage above the second threshold level. The process ends at step 816. If, at step 808, the usage is determined to be at or below the second threshold level, then the process may continue at step 816 where no action is taken as the customer is determined to be a typical or average customer who is not violating terms and conditions of his or her service plan.

Figure 9:
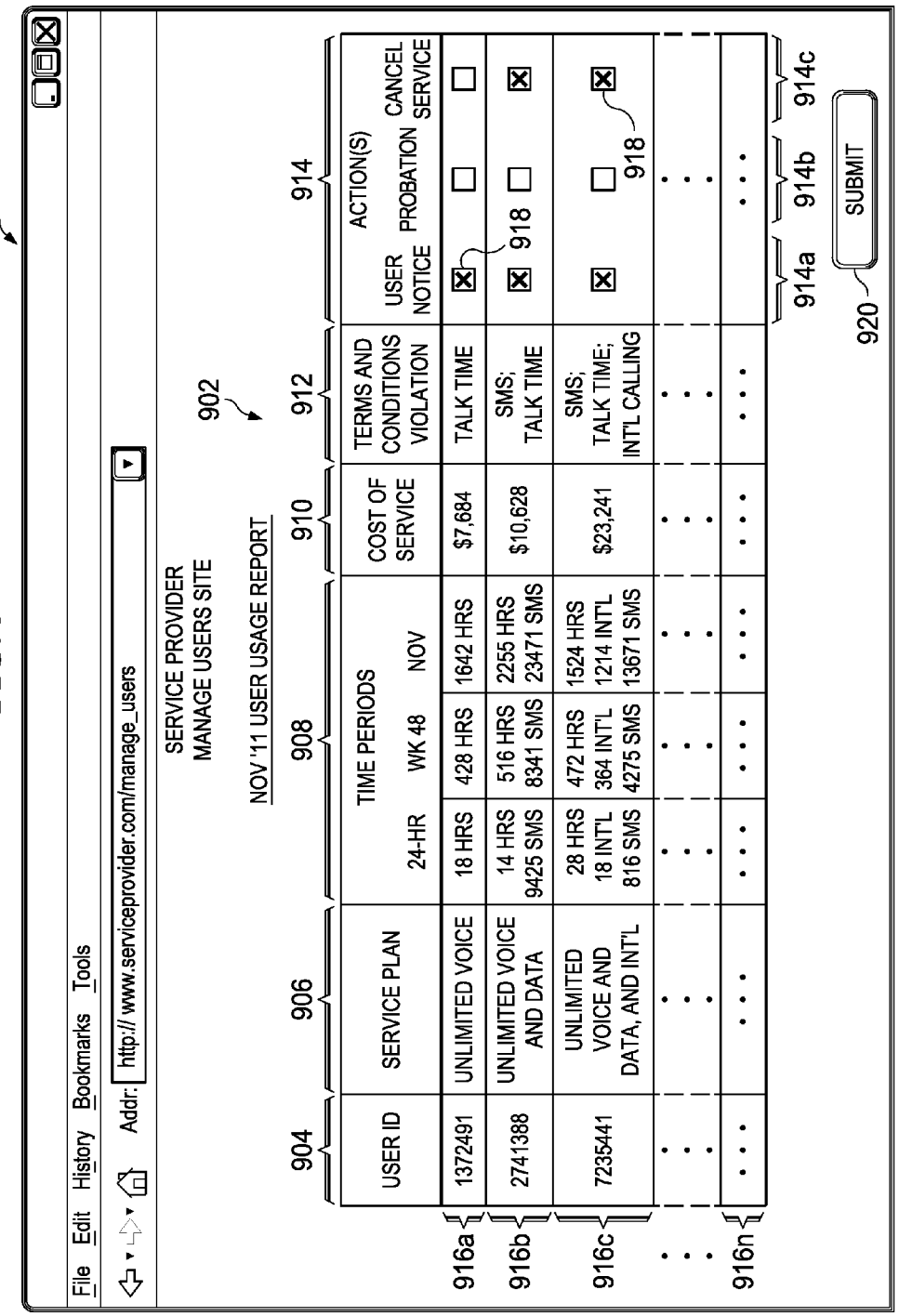
FIG. 9 is a screen shot of an illustrative user usage report that provides a communications service provider with the ability to manage actions with respect to the users.

With regard to FIG. 9, a screen shot of an illustrative user usage report 902 that provides a communications service provider with the ability to manage actions with respect to the users is shown. The user usage report 902 may include a variety of different columns, including user ID 904, service plan 906, time periods 908, cost of service 910, terms and condition violation 912, and actions 914. Additional and/or alternative data parameters may be included in the user usage report 902. The user ID 904 may include a user identifier alphanumeric code that identifies a user. As shown, there are a listing of data records of individual users 916a-916n listed in the user usage report 902. The listing may additionally include location of a user or an indication that each of the users listed in the user usage report 902 are from the same geographic region, for example. The service plan 906 may list certain parameters provided by the service plan, such as unlimited voice, unlimited voice and data, unlimited voice, data, and international calling, or otherwise. Alternatively, the service plan may simply list a name or identifier of a service plan that a user knows what service plan parameters are provided in the service plan. In one embodiment, the user usage report 902 may list all users in the same service plan, thereby negating the need for a service plan column in the user usage report 902.

The time periods 908 may include usage of communication services over one or more different time periods, such as 24 hours, a particular week within a year, an entire month, etc. As shown, customer or user 916a used 18 hours over a 24-hour time period of voice calls, 428 hours of talk time over an entire week, and 1642 hours over an entire month. Customer 916b used 14 hours of talk time over a 24 hour time period and had 942 short message service messages during the same 24 hour period. Customer 916c used 28 hours of talk time over a 24 hour time period, made 18 hours of international calls, and communicated 816 short message service messages. The reason the customer 916c was able to make calls for 28 hours over a 24 hour time period is likely because the customer either had multiple telephone lines, used conference calling or three-way calling features, or cloned his or her phone. The cost of service for each of the customers 916a-916c was $7,684.00, $10,628.00, and $23,241.00, respectively, over the month of November. As a result of the usage over the time periods and costs of services, the communications service provider may identify that certain terms and condition violations have occurred, including talk time, short message services, international calling, and so forth.

The user usage report 902 may provide the user viewing the report 902 with one or more possible action settings 914a-914c (collectively 914) to take, including user notification, probation, and cancel service. Each of the associated action settings 914 may have selection items 918, such as checkboxes or other graphical user element that allows a user or employee of the communications service provider to set an action item. In one embodiment, a system may be configured to automatically set action items or use defaults for the action items based on usage data associated with each of the customers. In one embodiment, historical usage data may be used to automatically set action items, such as having three months in a row of high voice call usage or international calling. In one embodiment, and as previously described with regard FIG. 8, if a user usage of the communication services is above a first threshold, then the system may automatically mandate certain actions to be taken without giving the user an option to override the action setting. Upon completion by the user reviewing the user usage report and selecting zero, one, or multiple actions, the user may select a soft-button 920 to submit the user usage report and initiate the selected actions to be taken.

Figure 10:
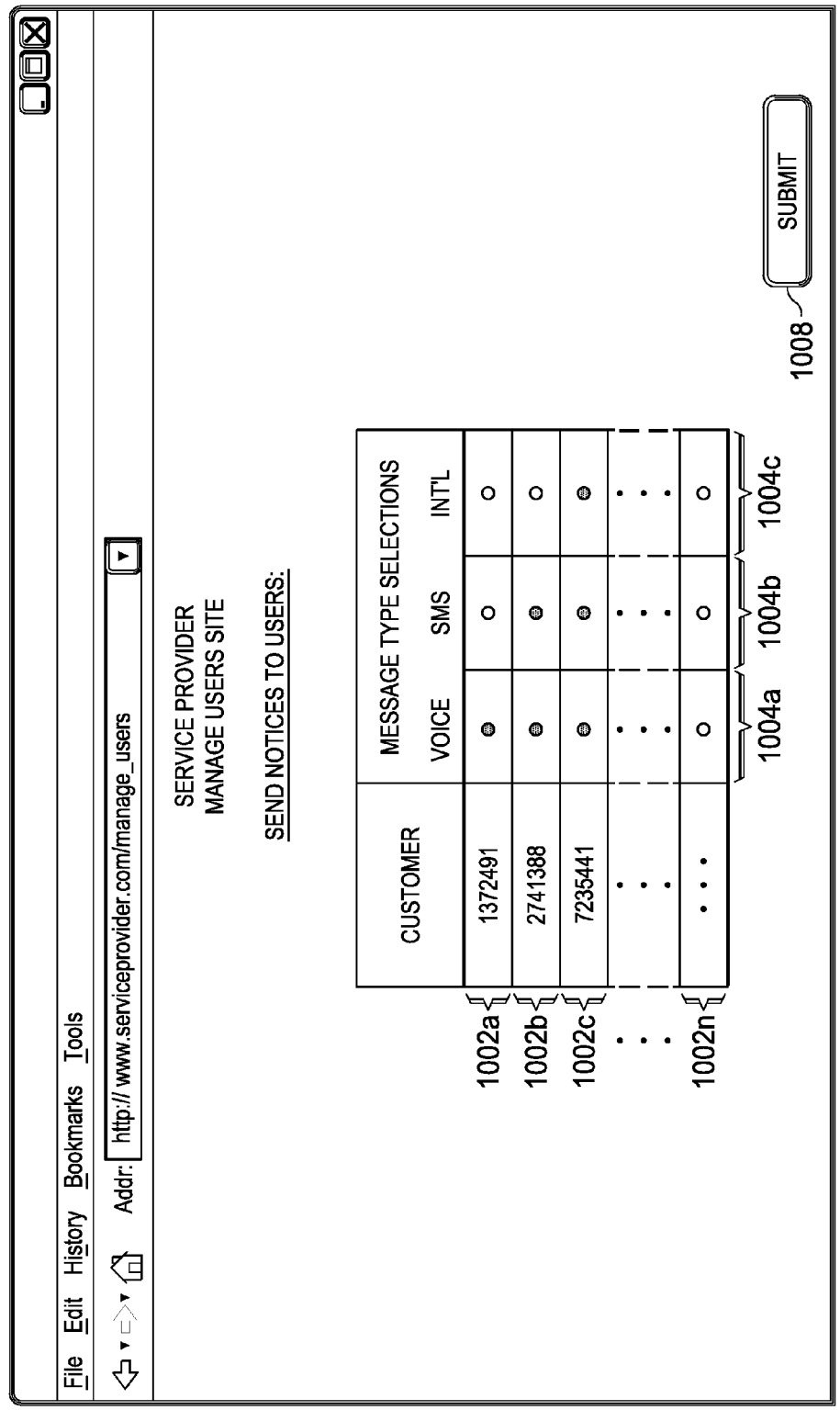
FIG. 10 is a screen shot of an illustrative management tool for a communications service provider to send notices to the users.

With regard to FIG. 10, a screen shot of an illustrative management tool 1000 for a communications service provider to send notices to the users is shown. A listing of customers 1002a-1002n (collectively 1002) is shown. Associated with each of the customer listings or records 1002, message type selections 1004a-1004c may allow for a user (e.g., employee of the communications service provider) to set what type of message to communicate to each of the individual users for violations of particular types of terms and conditions. For example, for customer listing 1002a, the user may select to communicate a message or notification to the customer as a result of the customer violating voice services terms and conditions. Customer listing 1002b may be selected by a user to receive a notice for both voice and SMS message violations, and customer 1004c may be selected to receive a message as a result of violating voice, SMS, and international terms and conditions. Additional and/or alternative terms and conditions of which a customer may violate may be provided for a user to select. It should be understood that this management tool may be in addition to the one shown in FIG. 9. It should further be understood that alternative tools, such as ones that do not require user selection for each customer, may be utilized. A user may select a "submit" soft-button 1008 to cause the selections for the message types to be submitted and cause message(s) to be communicated to the customer(s).

Figure 11:
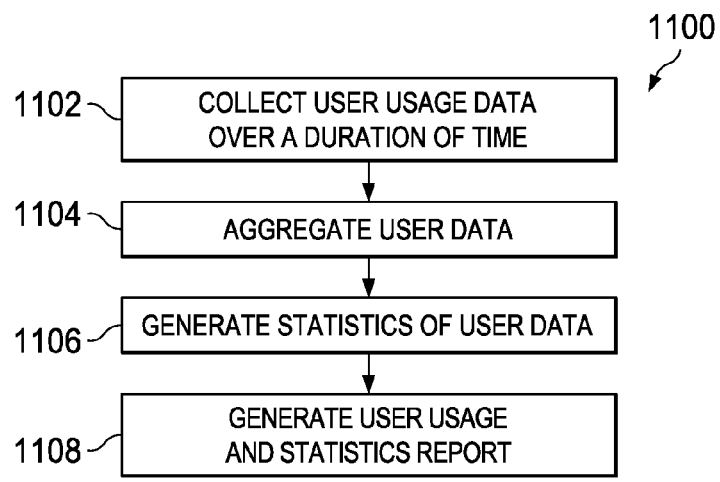
FIG. 11 is a flow diagram of an illustrative process for collecting and aggregating user usage data for creating statistics and generating a report.

With regard to FIG. 11, a flow diagram of an illustrative process 1100 for collecting and aggregating user or customer usage data for creating statistics and generating a report is shown. The process 1100 may start at step 1102, where user usage data may be collected over a duration of time. The user usage data may be collected from all or a subset of users or customers. The usage data may be usage of a wide variety of communications services, including aggregated voice telephone calls, local telephone calls, long-distance telephone calls, data messages, data download, international telephone calls, and so on. The aggregation of the user usage data may assist the communications service provider in determining whether one or more users as compared with statistics from the aggregated user usage data are using their communications services for non-personal use, as described hereinbelow. The aggregation of the user usage data may also assist the communications service provider to identify what destination network addresses or phone numbers are imposing unreasonably high costs to the communications service provider. The duration of time may be over one or multiple durations of time, as previously described. The collection of the user usage data may include storing the usage data in association with the individual users or customers. In one embodiment, the user usage data that is being aggregated may not be identified with specific users or customers.

At step 1104, the user data may be aggregated. In aggregating the user data, the user data may be aggregated on a global, regional or local level, for example. In one embodiment, the user data may be aggregated based on users with the same service plan. By aggregating user data based on service plan and/or geographical location, the communications service provider may be able to more precisely determine whether similar types of users or users who are in the same geographic region have excessive usage as determined from statistics of the aggregated users of the same type or location. In another embodiment, all of the calls to a particular number are aggregated to determine which numbers have excessive use.

At step 1106, statistics of the user data may be generated. The statistics may be statistics based on the aggregate user or telephone number data. In addition, the statistics may be generated from individual user data. The statistics may include Gaussian curves, standard deviations, arithmetic means, or any other statistics or correlations desired by the communications service provider that may assist in determining whether a user is violating terms and conditions of his or her service plan.

At step 1108, a user usage and statistics report may be generated. The user usage and statistics report may include total user usage during a time period, statistics requests on aggregate calls to a particular number during a period of time, statistics of a particular user with respect to an aggregate number of users, a listing of previous user usage statistics (e.g., number of previous times that a user has exceeded a statistical threshold, such as a standard deviation threshold), and, optionally, a soft-button that allows for a system user viewing the user usage and statistics report to initiate an action against the user or customer, as described in FIG. 9.

Figure 12:
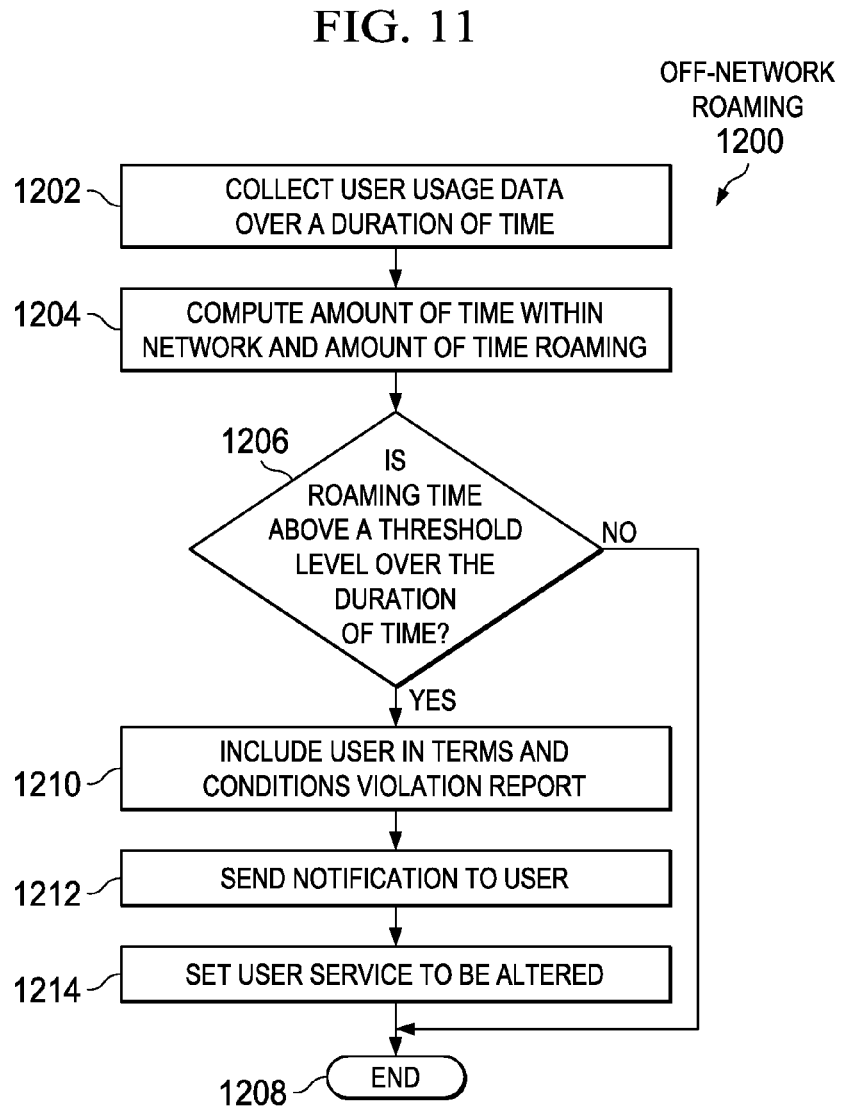
FIG. 12 is a flow diagram of an illustrative process for determining whether a user is violating terms and conditions for off-network roaming.

With regard to FIG. 12, a flow diagram of an illustrative process 1200 for determining whether a user is violating terms and conditions for off-network roaming is shown. The process 1200 starts at step 1202, where user usage data over a duration of time is collected. The user usage data may include off-network roaming of users of the communications service provider. At step 1204, a total amount of time within a network and amount of time roaming may be computed. In one embodiment, the time that is computed is time that the user is communicating, as opposed to simply being located, in the network and off-network roaming.

At step 1206, a determination may be made as to whether the computed roaming time is above a threshold level over the duration of time. In one embodiment, the threshold level may be a statistical threshold level, such as above 98% above off-network roaming of all other users as determined by a standard deviation. Alternatively, rather than using a standard deviation, a threshold value, such as a certain number of hours or minutes, may be used to identify a customer who may be abusing terms and conditions of his or her service plan. For example, the threshold value may be set to a specific percentage, such as 60 percent of total calls, where the percentage may be computed using a formula (e.g., out-of-market use/total use), or a specific number of minutes (e.g., greater than 10,000 minutes per month). Alternatively, multiple values may be used, such as number of roaming minutes during each day and number of days in month during which roaming occurred. For off-network roaming, a customer with a service plan that provides for unlimited calling minutes may be violating the terms and conditions if the customer does not live within a service coverage areas of the communications service provider, thereby causing the communications service provider to pay substantial fees to another communications service provider to provide for roaming services for the customer. If, at step 1206, it is determined that the customer has not accrued an amount of roaming time above the threshold level, then the process may end at step 1208 as the user may be determined not to be a violator of the terms and conditions of his or her service plan.

If at step 1206 it is determined that the roaming time of the customer is above the threshold level, then the process continues at step 1210, where the user may be included in a terms and condition violation report. The user being included in the terms and condition report may mean that a user identifier, usage information, historical information, and any other information may be included in the terms and condition violation report. At step 1212, a notification may be sent to the user to notify the user of his or her violation of the terms and conditions. It should be understood that the notification may be sent to the user via an electronic message, such as a text message, or any other communication method as described herein.

In one notification embodiment, rather than notifying the user of his or her violation of terms and conditions, the user may simply receive a warning that the user has exceeded a certain threshold and that future usage excesses may result in a disruption in service or otherwise. In another embodiment, each time the customer tries to complete a call while roaming, a system message notifying the customer that service is suspended, canceled, or terminated. In yet another embodiment, a notification may be sent to the user to notify the user of his or her violation of the terms and conditions and provide the user with a list of selectable service plans that may better suit the customer's usage patterns. For example, if it is determined that the customer roams excessively, but, optionally, lower than a threshold level that is defined by the service provider to clearly be abusive, then the user may select from the list of service plans to switch or upgrade his or her service plan. In one embodiment, the selected service plan may automatically be initiated. Alternatively, the selected service plan may be communicated to the service provider and a manager may review the requested service plan change and determine whether the customer qualifies for the new service plan. Alternatively, confirming qualification of the requested service plan may be performed prior to sending the list (i.e., only plan options for which the customer qualifies may be communicated to the customer) or after the customer selects the option. Although the ability to select a different service plan is described with respect to roaming, it should be understood that any other usage parameter may be identified and one or more service plans that better fits the usage pattern(s) of the user may be provided to the user for selection. It should be understood that in addition to monitoring usage that is excessive, the system may also identify usage that is low and provide service plan options that better matches usage that is low. In one embodiment, the system may identify multiple usage parameters (e.g., number of roaming minutes, number of local calls, number of on-network calls, number of long distance calls, number of minutes for international calls to one or more countries or regions, etc.) for both an excessive and low usage and offer a service plan to the user supports the user's usage for the different usage parameters.

At step 1214, the user service may be set to be altered. In being altered, the service may be suspended, terminated, canceled, certain features may be changed, such as auto-dialing, long distance calling may be restricted, bandwidth may be reduced, and so forth. Although not shown, the communications service provider may act upon the setting of the user's service being altered. The steps 1212 and 1214 may be optional, as a user who is listed on the terms and condition report may not have a notification sent or have services altered, but may simply be placed into a "watch" list of users who are to watched for further or future violations. The process ends at step 1208. One embodiment of the process 1200 may provide for multiple threshold levels to be utilized to determine if the user is objectively a violator of terms and conditions or if the user should be watched further to make a more subjective decision as to whether the user is violating terms and conditions. In one embodiment, both the objective and subjective decisions are fully automated. For the objective and subjective decisions to be fully automated, certain rules and threshold criteria may be utilized by a computer. In one embodiment, objective criteria may be used over one or more time periods (e.g., three days, one week, two weeks, etc.) after providing the customer with a notification of a violation to determine whether the customer changes his or her behavior. Such a probation period may provide for a subjective criteria examination of the customer.

As an example of excessive usage that illustrative of the customer for using his or her communications service for non-personal usage, if a determination is made that the average user sends 100 SMS messages in a 24 hour time period and an individual user is determined to send enough SMS messages to exceed a standard deviation of 99 percent of all users aggregated by the communications service provider, then the communications service provider may be said to be using his or her communications services for non-personal use. In an alternative embodiment, rather than comparing a user with statistics of an aggregated number of users, the communications service provider may simply set a threshold level, such as 1,000 SMS messages in a 24-hour time period, to cause the customer to be placed on a watch report. From there, the communications service provider (e.g., computing system of the communications service provider) may identify any customer who has sent over 40,000 in a 24-hour time period and automatically identify that user as performing non-personal use and action may automatically be taken against the customer (e.g., terminating service). If, for example, a customer is determined to have a certain range of SMS messages in a single day, such as between 5,000 and 40,000, then the customer may be reviewed in more detail (e.g., review for auto-dialing or auto-texting) for whether non-personal use is taking place by the customer. If, as another example, the customer is sending messages not permitted by the service provider, such as SPAM, phishing, or harassing messages, the customer's use may violate the service provider's terms and conditions. If it is determined that the customer is using the communications service for non-personal use, then action may be taken, such as a warning message may be communicated to the customer. If the customer continues to perform in the same manner, then additional action may be taken (e.g., termination and a message to the customer that SMS services have been suspended or terminated and to call a telephone number to speak with the communications service provider). It should be understood that the non-personal use SMS messaging can be extended to voice calls, such as total number of calls in an hour (e.g., 60 or more calls an hour), average duration of calls (e.g., below a minute or longer than an hour), and so on.

Although shown as a single threshold, it should be understood that multiple thresholds may be utilized for one or more usage parameters. For example, rather than simply determining that the roaming time is over a certain threshold, one or more ranges of thresholds may be used to determine if a user's roaming time is at level that suggest improper usage rather than abuse and respond to that usage level in a suitable manner (e.g., notification but not cancelation). It should further be understood that multiple usage parameters may be utilized in determine whether the user is violating terms and conditions. In one embodiment, if multiple usage parameters are utilized, then an aggregated assessment of the usage parameters may be made. In one embodiment, threshold levels may be lowered for each individual usage parameter and an aggregate assessment may be made in considering the multiple usage parameters in an attempt to catch violators who are excessive users, but try to game the system by staying slightly below one or more usage parameter categories.

Figure 13:
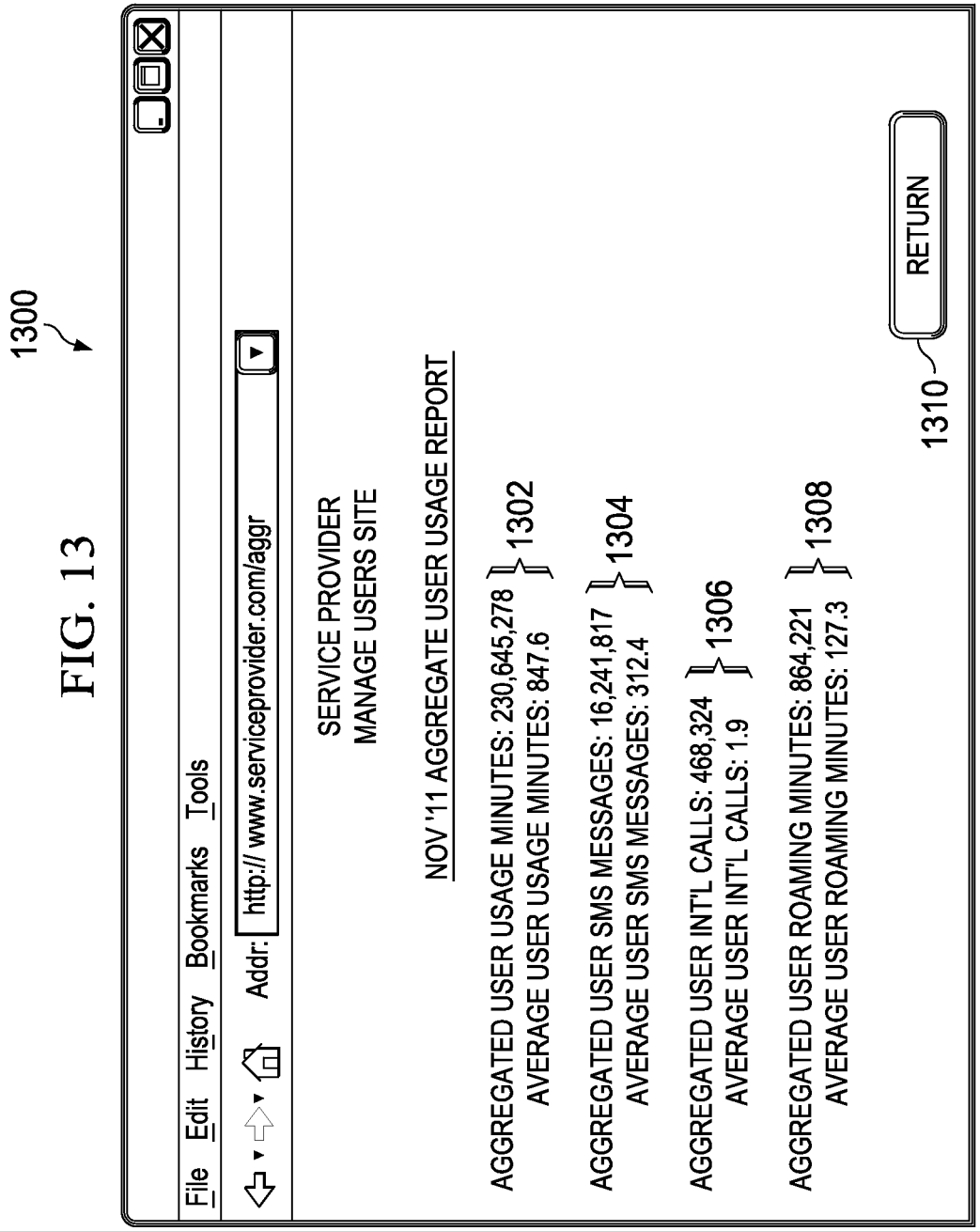
FIG. 13 is a screen shot of an illustrative aggregate user usage report that lists a number of different usages.

With regard to FIG. 13, a screen shot showing an aggregate user usage report 1300 is shown to include total or aggregated user usage for placing telephone calls 1302, aggregated user SMS message usage 1304, aggregated user international calls 1306, and aggregated user roaming minutes 1308. The aggregated user usage telephone calls 1302 may include aggregated number of usage minutes of all customers and average user usage minutes of the customers. In an alternative embodiment, in addition to or rather than showing an aggregate of all customer usage, an aggregate of a subset of customers usage may be shown. The subset may include customers in a particular region, geographic location, and/or service plan. Rather than showing a localized geographic region, the subset may include customers who are residents near boundaries of a service area provided by the communications service provider.

The aggregated user SMS message usage 1304 may include total user SMS messages and average user SMS messages during the time period, which, in this case, is November, 2011. The user international call usage 1306 may include total user international calls (i.e., a total number of international calls made by customers of the communications service provider) and average number of international calls made per user. The user roaming usage may include an aggregated number of minutes of user roaming and average user roaming minutes. These four user usage parameters 1302-1308 are illustrative, and it should be understood that additional and/or alternative customer usage parameters may be utilized to monitor customer usage and determine when customers may be violating terms and conditions of a communications service plan.

With regard to FIG. 14, a screen shot of an illustrative user usage report 1400 for off-network roaming is shown. The user usage report 1400 may include a chart 1402 that includes a number of parameters, including user ID 1404, home region 1406, total roaming time/roaming usage locations/percentage 1408, terms and condition violation 1410, and action(s) 1412. The chart 1402 is shown to include customer records 1414a-1414n (collectively 1414) for all the users who have been determined to violate off-network roaming terms and conditions. As shown, customer 1414a, who is determined to be roaming in a geographic location with zip code 02062, has 100% of off-network roaming (ONR) of his or her usage. In other words, all 2202 minutes of phone calls during November were placed or received in zip code 02062, which is not within a service area of the communications service provider. As a result, it may be initially assumed that the customer is either on an extended travel schedule or has falsified that he or she lives in a coverage area of the communications service provider (i.e., the customer lives in a location that the communications service provider does not, in fact, have service coverage).

The terms and condition violation parameter may be listed as "yes" to indicate that the customer is violating the terms and conditions of his or her service plan. As shown, a "local" soft-button may be available for a user to select to show statistics of other local users in the zip code in which the customer has performed his or her off-network roaming communications. The statistics may show an average amount of time that other local customers (i.e., a subset of customers of the communications service provider) have spent roaming and, if the number of minutes of the average local customer tends to be higher, then the user or operator at the communications service provider may be able to determine that the customer's off-network roaming usage is not exceptionally high relative to other local customers as the coverage area may be borderline to a service area of the communications service provider in that geographical location or may be an area where the communications service provider's system does not provide adequate coverage. If the average roaming time of customers local to the customer is high, then the user who may be determining whether or not to take an action against may be able to make a more fair assessment of the particular customer with regard to other users in that local geographic area. The selectable action(s) 1412 may include sending a notice to a user 1412a and canceling service of the user 1412b. The user usage report 1400 may be stored for a period of time, such as five years, and reviewed for new customers to ensure that a customer that was previously identified as an abuser does not attempt to receive services from the communications service provider. Such a review may be performed by a computing system by reviewing names, addresses, and any other identifier associated with the customer.

With regard to FIG. 15, a screen shot of an illustrative aggregate user usage report 1500 in a particular geographic area is shown. The aggregate user usage report 1500 may include aggregated user usage minutes in the zip code, average user usage minutes in the zip code, and average user roaming minutes in the zip code. In addition, statistical information, including a standard deviation chart 1504, may be included with the report 1500. The standard deviation statistics may include a 50% standard deviation, 90% standard deviation, 95% standard deviation, and 98% standard deviation, for example, from the standard deviations of local customers. A user who is making a decision as to whether to communicate a message and/or alter services being provided to the customer may factor in the standard deviation statistics of other customers local to the customer. In one embodiment, the standard deviation chart 1504 may show one or more customers (e.g., customer IDs) to show how the customer(s) compare to other customers of the communications service provider. A "return" soft-button 1506 may be selected to enable the user to return back to the user usage report of FIG. 14.

With regard to FIG. 16, a flow diagram of an illustrative process 1600 for a communications service provider to generate a report of a user violating terms and conditions and placing international calls is shown. The process 1600 starts with step 1602, where user usage data is collected over a duration of time. The user usage data may include a subset or all of user usage of the customers of the communications service provider and individual users or customers. In other words, the usage information including international phone calls may be collected for each user or subset of users and aggregated. At step 1604, a tabulation of calls being placed to different countries may be tabulated. The tabulation may include tabulating how many calls to different countries from each customer or user. While it is possible for some customers to have relationships with people in several different countries, customers who may violate his or her terms and conditions by enabling non-customers to make calls to their relatives in different countries tend to have higher numbers of calls to more different countries for longer periods of time. And, if the customer has an unlimited calling plan for placing calls, including international calls, the communications service provider may have significantly higher costs if the customer shares his or her telephone or service with non-customers. The communications service provider may be able to provide certain services, such as unlimited international calling, but those services are planned using typical customer usage metrics that will allow the communications service provider to make a profit in providing those services. If customers abuse the unlimited "privileges," then the communications service provider may lose money as a result of a few abusers who violate the terms and conditions of the service plan.

At step 1606, a determination may be made whether usage for numbers of calls to different countries and/or duration of international calls is above one or more threshold values may be made. If the answer is no, then the process ends at steps 1608. However, if a determination is made that the usage by the customer results in calls being placed to more countries than one or more threshold values (e.g., six or more different countries) and/or duration (e.g., minutes of use (MOU)) of calls being above one or more threshold values, then the process continues at step 1610, where user information may be included in a terms and condition violation report. The user information may include a user ID, number of countries that the customer has called and/or duration of international calls over a time period, such as a week or a month, and any other information that may assist the communications service provider in determining whether the customer is actually violating terms and conditions of the customer's service plan for international calling. For example, the additional information may include citizenship of the user, birth place of the user, international traveling information of the user, socioeconomic information of the user, and so on. At steps 1612, a notification may be sent to the user, and at step 1614, user service may be set to being altered, such as being suspended, being prevented from placing unlimited international calls, requiring a calling card to be used for international calls, termination of service, and so forth. In one embodiment, an intercept message may be automatically generated and sent to the customer by a network element, such as a router, in response to the customer attempting to place an international call after a determination at step 1606 is positive. The intercept message may state to the customer, for example, that "Future international calls may be made, but only through use of a calling card or other calling feature, but no longer through an unlimited international service plan. Please contact your service provider for more details at 800-555-1234." As described with respect to FIG. 12, steps 1612 and 1614 may be optional depending upon the findings of the communications service provider with respect to the customer's background, travels, socioeconomic position, and so forth. The process ends at step 1608.

Continuing with FIG. 16, and as further described with regard to FIG. 12, multiple threshold levels may be utilized to manage different levels of usage. For example, rather than having a single decision step 1606, multiple levels at decision step 1606 may be utilized to determine whether a certain number of international calls or duration of international calls are made. If the numbers or duration of international calls rise above a first level, but below another higher level, then a decision, either objectively (e.g., automatically) or subjectively (e.g., automatically or manually), may be made as to whether the customer is violating the terms and conditions or whether some other violation is occurring.

With regard to FIG. 17, a screen shot of an illustrative users international usage report 1700 is shown. The report may include a chart 1702 that lists user ID 1704, number of countries that a user has called during a time period 1706, number of international calls 1708, minutes of use of all international calls 1710, terms and conditions violation (e.g., clause, paragraph number, document number) 1712, and selectable action(s) 1714 available for the communications service provider to take in response to customers violating international usage terms and conditions. The chart 1702 may list user records 1716a-1716n with each of the different parameters previously described. The selectable actions 1714 may be initiated by a user selecting graphical user element(s) 1714a and/or 1714b to initiate notifying a customer and canceling service, respectively.

A user or employee of the communications service provider may select which, if either, action to take to address the violation of the terms and conditions. As shown, a "view" soft-button 1718 may allow for a user to view what countries are being called by the associated user or customer during the time period. If the calls appear to be made to countries or territories to which the communications service provider expects based on the customer's nationality, profession, or history, which may be stored in the customer's profile or records, for example, then the communications service provider may decide not to take any action. However, if the calls appear to be made in violation of the customer's terms and conditions (e.g., made by people other than the customer him or herself), then the communications service provider may take action by selecting one or both of the selectable action(s) 1706. It should be understood that additional and/or alternative actions may be available for the communications service provider to take. When the user of the communications service provider is finished with the report 1700, then the user may select a "submit" soft-button 1720 to submit any action 1714 that have been selected to be performed by the communications service provider.

With regard to FIG. 18, a flow diagram of an illustrative process 1800 for a system to determine whether excessive usage or calls placed to a particular termination number that violates terms and conditions of a service plan has occurred is shown. The process 1800 start to step 1802, where user or customer usage data may be collected over a during a time. The user usage data may include usage data generated from customers using communications services provided by the communications service provider. The user usage data may include numbers of calls, duration of calls, number of international calls, duration of international calls, number of data messages, amount of data download, and so forth. It should be understood that the listed categories are illustrative and that a number of other or different categories of excessive user usage may be generated and collected.

At step 1804, user usage data may be analyzed for the different categories of terms and conditions violation for excessive usage. The analyses may include totaling one or more of the user usage data categories to allow for comparison purposes. At step 1806, a determination may be made as to whether excessive usage has been conducted by the customer. In one embodiment, the determination may be made by comparing the customer's usage with statistics (e.g., standard deviation) of an aggregated number of customers, fixed threshold levels (e.g., over 500 hours per month, 10,000 text messages per month, etc.), or otherwise. If it is determined that the customer has not had an excessive usage during the time period, then the process 1800 may continue at step 1808, where the system may accumulate call data to one or more termination phone numbers or network addresses, as further described herein. If, however, it is determined at step 1806 that excessive usage has been made during the time period, then the process 1800 may continue at step 1810, where the user may be listed in one or more excessive usage reports (e.g., duration of calls usage report). At step 1812, action may be taken against the user or customer, such as communicating a message to the customer of his or her excessive usage and/or a change in service for the customer. In one embodiment, and as provided with regard to FIG. 16, an intercept message may be automatically generated and sent to the customer by a network element, such as a router, in response to the customer attempting to place additional calls or perform certain data transactions (e.g., downloads or streaming) after a determination at step 1806 is positive. The intercept message may state to the customer, for example, that "Future communications may be made, but only through use of a calling card or other calling feature, but no longer through an unlimited calling and/or data service plan. Please contact your service provider for more details at 800-555-1234." The process 1800 may continue at step 1808, as previously described.

In addition to taking action by including the customer in a report and sending a message to the device of the customer, the principles of the present invention may further provide for tracking the device(s) (e.g., mobile communications device) of the customer. In tracking the device(s) of the customer, GPS or other device tracking techniques as understood in the art may be utilized in accordance with the principles of the present invention. Tracking the device(s) of the customer may enable law enforcement, for example, to locate and take action against the customer. In another embodiment, in addition to canceling service to the customer, an identifier associated with the device may be stored in a "black list" to prevent future use of the device from being used on a new account for the same or different customer. Because the device(s) may be more expensive than the services being provided, such tracking and "black listing" of the device(s) may result in changing the behavior of the customer in the future. These actions may be utilized for any of the violations of service plans described herein or that are part of a communications service plan.

At step 1814, a determination may be made as to whether calls and/or costs to one or more termination phone numbers or network addresses exceed respective threshold levels. The user usage data may include a number of calls placed to a particular phone number that is determined to have a high cost of service to the communications service provider due to providing unlimited calling services. In one embodiment, a termination number or network address may have a high cost of service if it is within a roaming region of the country that allows for three-way calling, and charges the communications service provider for providing that communications service. Such a communications scheme is generally known as traffic pumping, as previously described, and has been found to be used by scammers who, in essence, collect fees from the roaming communications service provided for sourcing calls to that communications service provider. As a result of engaging in such a communications scheme, the customer is defrauding his or her communications service provider, as the communications service provider can lose a significant amount of money through this fraudulent scheme.

In one embodiment, the threshold levels for identifying a customer (or high-cost network address) may be determined in relation to or based on statistics of an aggregate of customers. That is, statistics of an aggregate of customers, either all customers or a subset thereof, may vary as customer usage varies, and the threshold levels may vary, as well. In some cases, certain network addresses may be known or suspected as being used for fraudulent purposes. In other cases, network addresses that are used for fraudulent purposes may be determined by identifying high-cost network addresses over a time period as a result of one or more customers placing calls to those high-cost network addresses. While such high-cost telephone numbers may be identified as a result of a single customer placing excessive calls or communications to the high-cost network address, high-cost telephone numbers may be identified by the communications service provider as a result of more than one customer calling the network address. Telephone numbers and/or network addresses that are known to have high numbers of calls, such as emergency services (e.g., 911), information services (e.g., 411), or otherwise, may be removed from being monitored for being high-cost telephone numbers.

If it is determined at step 1814 that the customer has not had excessive calls and/or created excessive costs as a result of calling or communicating particular phone numbers or network addresses, then the process may continue at step 1816 where the process ends. If, however, the process at step 1814 determines that the number of calls and/or costs generated by the customer calling or communicating with a particular network address or phone number is above a threshold level (e.g., statistical, fixed, or otherwise), then the process 1800 may continue at step 1818, where the termination telephone number(s) or network address(es) may be removed from a call or data feature. In one embodiment, the call feature is an unlimited number of telephone calls to the particular telephone number(s) or network address(es). In another embodiment, the data feature is an unlimited amount of data download or data streaming. At step 1820, the process 1800 may allow the communications service provider to take action against the customer, where the action may include adding the customer to a particular list or report, such as a violation of a certain term or condition report, communicating or notifying the customer of the removal of the network address from the call feature, and/or changing service to the customer. In one embodiment, an intercept message may be generated and communicated to the customer by a network element in response to the customer attempting to place a call or perform a certain data operation that has been identified as exceeding a threshold level. The process 1800 may end at step 1816. It should be understood that the principles of the present invention may provide for multiple levels in determining whether calls and/or cost to a termination phone number (or Internet address) exceeds one or more threshold levels in the same or similar manner as described with regard to other call or data features.

With regard to FIG. 19, a screen shot of an illustrative excessive usage report 1900 that a communications service provider may use to identify customers with excessive usage and initiate action to notify a user of the excessive usage and/or alter service is shown. The report 1900 may include a chart 1902 that includes customer data records 1904a-1904n (collectively 1904). The customer data records 1904 may include user ID 1906, minutes of use 1908, percentage of outbound calls 1910, average call duration 1912, calls to numbers on an excessive call list 1914, violated sections or identifiers of terms and conditions 1916, and selectable action (s) 1918 may be listed. In one embodiment, if the system determines that a customer is violating more than one term and condition, then the system may automatically suspend service of a customer or take any other action without human intervention. It should be understood that additional and/or alternative information may be listed in the chart 1902.

The customer data records 1904 may show that a percentage of outbound calls for each of the listed customers may be excessively high on a percentage basis as compared to a subset or total number of customers of the communications service provider. As shown, customer 1904a has a 64% outbound call ratio as compared to the total number of calls that the customer has made over the time period, while customer 1904c has 96% of his or her calls being outbound. In addition, the calls to numbers on an excessive call list by the customer 1904a is 54%, while calls to numbers on the excessive call list for customer 1904c is 99%. Having such a high percentage of outbound calls may mean that the customer is sharing or re-selling communications services to non-customers, both behaviors of which are generally considered violations of terms and conditions of the communications service provider. As a result, customer 1904a is determined to have violated terms and conditions sections 1.03 and 1.04, while customer 1904c is determined to have violated terms and conditions sections 1.01, 1.02, 1.03, and 1.04.

A user or employee of the communications service provider may select graphical user elements 1918a and/or 1918b, which may cause generation of a user or customer notification and/or canceling service to the customer. Again, additional and/or alternative actions may be made available to the user or employee of the communications service provider to take based on reviewing the report. In one embodiment, rather than requiring a user of the communications service provider to actively select what actions to take, a computing system may automatically select actions to take in response to determining what terms and conditions have been violated based on customer usage as compared to an aggregation of usage data of other customers, using statistics, or otherwise. A user may select a "submit" soft-button 1920 when finished reviewing the users excessive usage report 1900.

With regard to FIG. 20, an illustration of an illustrative communications device 2000, such as a mobile telephone, is shown. As shown, the communications device 2000 is displaying a message 2002 on a screen 2004 to notify the customer that future calls to a particular telephone number in the future must be made by alternative means, such as through using a calling card. This message 2002 may be communicated to the customer in response to the customer placing calls to a high-cost telephone number or network address that has been identified by the communications service provider as being used for unacceptable purposes in the view of the communications service provider. In the future, the customer may be able to call that telephone number, but may be required to use a calling card or some other means that does not cause the communications service provider to pay excessive charges for the customer's calling that telephone number. The customer may select an "OK" soft-button 2006 when finished reviewing the message 2002. In one embodiment, a network element, such as a server, may be configured to automatically issue the message to the customer in response to identifying that the customer is attempting to place a call using the calling feature to the telephone number. The communications service provider may have the ability to override the system, if desired or if different terms are worked out with the customer, for example.

With regard to FIG. 21, a flow diagram of a process 2100 for a network analysis of high cost telephone numbers to be made to remove those telephone numbers from a calling feature is shown. The process 2100 starts at step 2102, where called telephone numbers and call information associated with calls place to the called telephone numbers may be collected by network equipment. In one embodiment, the network equipment may be communications equipment 216 of FIG. 2. In another embodiment, the communications equipment 216 may be utilized in conjunction with non-network equipment, such as computing system 202, to provide for the network analysis of high cost telephone numbers. The collection may be performed in a variety of ways, including monitoring calls on an aggregate level or in association with each customer by inspecting data packets to identify calls being placed to particular telephone numbers, for example. Although data packet inspection may be utilized, it should be understood that the principles of the present invention are content neutral. That is, voice and/or data content is not captured, monitored, recorded, or otherwise utilized in the process 2100 for determining high cost telephone numbers. The fact that communications may be monitored for being real time (e.g., voice calls) or non-real-time (e.g., SMS messages) may be factored, as well. Because certain telephone numbers, such as emergency services, poison control, welfare, toll-free numbers, and so on, are required or do not cost a communications service provider, step 2102 may collect call information for calls placed to telephone numbers that do not fall into these categories.

At step 2104, statistics of called telephone numbers may be generated. The statistics may include totaling number of calls to individual telephone numbers, total amount of time calls are placed to telephone numbers, average amount of time of calls to telephone numbers, mean amount of time that calls are placed to telephone numbers, standard deviations for call parameters (e.g., number of calls, amount of time, etc.). In one embodiment, the generation of statistics may be performed by network equipment 214. Alternatively, a communications service provider may utilize a non-network computing system (i.e., a computing system that is not in a communications path for the telephone calls, such as a server that operates to manage calls of customers of the communications service provider).

At step 2106, costs for providing calling services to called telephone numbers may be determined. In one embodiment, the costs for providing the calling services to the called telephone numbers may be determined based on rates that carriers charge one another for long distance calls placed by customers of a communications service provider. Such rates may be established through agreement between the carriers. In determining the costs, a computing system may determine the types of calls that are placed (e.g., long distance), the call paths through which the calls are placed, and so on, and apply charges for each of the call paths (e.g., tolls or costs of which each carrier along the call paths apply) and durations of times of the calls, as understood in the art.

At step 2108, high cost called telephone numbers may be determined. The high cost called telephone numbers may be identified based on the statistics or simply on the costs for the called telephone numbers as determined at step 2108. The identification of the high cost called telephone numbers may be made in a variety of different ways, including identifying called telephone numbers that are outside of a standard deviation of all called telephone numbers (e.g., standard deviation of 98 percent or higher), the top number (e.g., 200) of highest cost called telephone numbers, or any other manner that may be determined to identified which called telephone number have the highest cost for the communications service provider. In one embodiment, the communications service provider may determine highest cost called telephone numbers on a per service plan basis. For example, a prepaid, free nights and weekends service plan may have different high cost called telephone numbers than a prepaid, unlimited service plan.

At step 2110, a generate list of high cost called telephone numbers may be generated. The list of high cost called telephone numbers may include those called telephone numbers that are identified in step 2108. The list may thereafter be used by the communications service provider at step 2112 to remove the high cost called telephone numbers from certain calling features, such as unlimited long distance calling features. In one embodiment, the list of high cost called telephone numbers may be provided to the network equipment, such as a switch, router, or other network equipment to prevent callers with a calling feature from being able to place calls using that calling feature.

At step 2114, in response to a caller with the calling feature placing a call to the high cost called telephone number that has been removed from the calling feature (or on the list of high cost telephone numbers), the caller may be notified that the telephone number has been removed from the calling feature. The notification may be in the form of a signal (e.g., busy signal), automated voice message (e.g., "This telephone number can no longer be accessed using the unlimited, long distance calling feature. Please use a calling card to call this telephone number."), SMS message to the caller, a combination of these notifications, or an alternative notification method. As is provided with regard to FIG. 22, while the process 2100 describes telephone calls, the principles of the present invention provide for assessing any form of electronic communications, including messaging, downloading, and so forth.

With regard to FIG. 22, a block diagram of illustrative software modules 2200 that may be executed on the network equipment 214 (FIG. 2) and/or computing system 202 (FIG. 2). The modules 2200 may include a collect network traffic to destination addresses module 2202 that may be configured to collect network addresses on one or more communications network to which customers of a communications service provider call. The destination addresses may be stored in a data repository, and used for accumulating data associated with customers communicating with those destination addresses.

A calculate statistics of network traffic module 2204 may be utilized to determine statistics of communications to the destination addresses collected by the module 2202. The statistics may include any usage statistics that the communications service provider may desire. In one embodiment, the statistics may include total number of calls over a time period, number of calls over a time period, and so on.

A determine cost of network addresses module 2206 may be configured to determine costs associated with the destination addresses. In one embodiment, rather than computing costs for all destination addresses to which customers have communicated, a determination of costs may be limited to those network addresses that have the highest statistics (e.g., most calls placed to telephone numbers, longest distances of calls, or otherwise). Because high costs may be result for a variety of reasons, the module 2206 may be configured to account for cost factors for the communications service provider. Toward that regard, the modules 2202 and 2204 may collect and process parameters that are cost factors for the communications service provider.

An identify high cost network addresses module 2208 may be configured to identify high cost network addresses. As previously described, high cost destination network addresses may be other than those that have the highest number of calls or communications placed thereto. The high cost network addresses may be stored and used for the purposes or eliminating those destination network addresses from calling features, such as long distance calling features.

An intercept calls to high cost network addresses module 2210 may be configured to intercept calls to the high cost network addresses by network equipment (e.g., routers, switches). The module 2210, of course, will utilize a predefined set of network addresses that have ultimately been determined to be high cost numbers that are removed from certain calling features by module 2212, as described below. In one embodiment, the module 2210 may be caller agnostic (i.e., independent of what particular caller is placing a call).

A remove network addresses from communication feature module 2212 may be configured to remove network addresses from communication features. This module 2212 may be automated, semi-automated, and/or manual in terms of which network addresses are removed from a communications feature (e.g., international calling). In one embodiment, the module 2212 may be configured to automatically remove network addresses that have a standard deviation at 99 percent and higher.

A caller notification module 2214 may be configured to notify a caller or someone communicating data to a network address that has been removed. The notifications may be audio notifications (e.g., busy signal, audio spoken message) and/or data messages to the customers in response to a customer attempting to communicate with a removed network address from the communication feature. The notification may include instructions to the customer to contact the removed network address in a different way from how the customer is attempting to contact the network address (e.g., by using a calling card).

Although a number of particular GUIs and data displayed on the GUIs have been shown, it should be understood that the principles of the present invention may be performed using no, alternative, and/or additional GUIs and data may be utilized in performing the principles of the present invention.

The previous description is of a preferred embodiment for implementing the invention, and the scope of the invention should not necessarily be limited by this description. The scope of the present invention is instead defined by the following claims.

What is claimed:

1. A system for operating communications services of a communications service provider, said system comprising:
   a storage unit configured to store information associated with a customer of the communications service provider, at least a portion of the information including information associated with unlimited communications services provided by the communications service provider;
   a computing system in communication with said storage unit and being configured to:
      collect usage data of the user during a time period associated with the unlimited portion of the service plan;
      determine whether the usage data is indicative of the user using the communications services in violation of service terms and conditions associated with the unlimited portion of the service plan;
      perform an action in response to determining that the user is in violation of the terms and conditions;
      determine that cost value for calls placed to a telephone number during the time period by the user is a cost value that exceeds a threshold cost value; and
      in response to determining that the cost value to the telephone number called by the user exceeds the threshold cost value, remove the telephone number from a calling feature.

2. The system according to claim 1, wherein said computing system, in collecting the usage data, is further configured to:
   collect calling data;
   total amount of time of calls over the time period; and
   wherein said computing system, in determining whether the total time is more than a threshold amount of time, is configured to determine whether the total time is more than a threshold amount of time during the time period.

3. The system according to claim 1, wherein said computing system, in removing the telephone number, is further configured to remove the telephone number from an unlimited calling feature.

4. The system according to claim 1, wherein said computing system is further configured to:
   play an announcement to the user when calling the telephone number that the telephone number has been removed from the unlimited long distance calling feature, but accessible by using the one or more alternative techniques; and
   enable the user to call the telephone number through use of an alternative payment method.

5. The system according to claim 4, wherein said computing system, in enabling the user to call the telephone number though use of an alternative payment method, is further configured to enable the user to use a prepaid calling card.

6. The system according to claim 1, wherein said computing system, in determining whether the usage data is indicative of the user, is further configured to:
   collect usage data from at least a subset of all users of the communications services;
   compute at least one usage parameter of the at least a subset of all users;
   determine a standard deviation threshold usage value of the at least one usage parameter;
   determine that the user has a standard deviation of usage above the standard deviation threshold usage value of the at least one usage parameter; and
   in response to determining that the user has such a standard deviation of the at least one usage parameter, communicate a message to the user so as to notify the user of the violation of service terms and conditions.

7. The system according to claim 6, wherein said computing system, in computing at least one usage parameter, is configured to compute cost of servicing during the time period.

8. The system according to claim 6, wherein said computing system, in computing at least one usage parameter, is configured to compute average amount of time of calls on which the at least a subset of all users were communicating during the time period.

9. The system according to claim 1, wherein said computing system, in determining whether the usage data is indicative of the user using the communications services in violation of service terms and conditions, is configured to:
   determine that substantially all calls using the unlimited portion of the service plan from the user are outbound; and
   in response that substantially all calls using the unlimited portion of the service plan are outbound, communicate a message to the user so as to notify the user of the violation of service terms and conditions.

10. The system according to claim 1, wherein said computing system, in determining includes determining that the user is using the unlimited portion of the service plan for non-personal use; and
   in response to determining that the user is using unlimited portion of the service plan for non-personal use, performing the action by notifying a service provider of the user and usage thereof.

11. The system according to claim 1, wherein said computing system, in determining whether the usage data is indicative of the user using the communications services in violation of service terms and conditions, is configured to:
   determine an amount of roaming during the time period using the unlimited portion of the service plan; and
   in response to determining that the amount of roaming is above a threshold roaming value, perform the action by communicating a message to the user that the service terms and conditions are being violated.

12. The system according to claim 1, wherein said computing system, in determining whether the usage data is indicative of the user using the communications services in violation of service terms and conditions, is configured to:
   determine that a number of data messages communicated by the user using the unlimited portion of the service plan during the time period exceeds a threshold data message value; and
   in response to determining that the number of data messages exceeds the threshold data message value, perform the action by notifying a service provider of the excessive data message communications.

13. The system according to claim 1, wherein said computing system, in determining whether the usage data is indicative of the user using the communications services in violation of service terms and conditions, is configured to determine, that a number of international long distance calls placed using the unlimited portion of the service plan exceed a threshold value; and in response to determining that the number of international long distance calls exceeds a threshold value, notifying a service provider of the excessive number of international long distance calls.

14. The system according to claim 1, wherein the unlimited portion of the service plan is provided to the user for a fixed rate during the time period.

15. The system according to claim 1, wherein said computing system, in providing the service plan, is configured to provide the service plan as a paid in advance service plan.

16. The system according to claim 1, wherein said computing system, in providing a service plan, is configured to provide a service plan with the portion of the communications services being unlimited being for a portion of a day.

17. The system according to claim 1, wherein said computing system, in providing the service plan, is configured to provide the service plan without a multi-month contractual period.

18. A system for operating communications services by a communications service provider, said system comprising:

a storage unit configured to store information associated with a plurality of customers, the information including information associated with a communications service plan being provided to the customers;

a computing system in communication with said storage unit and being configured to:

collect usage data of at least a subset of the customers over a time period;

aggregate the usage data of the at least a subset of the customers;

compute statistics of the aggregated usage data;

compute a statistical threshold value as a function of the statistics of the aggregated usage data;

access usage data of a customer of the at least a subset of the customers;

compare the usage data of the customer with the statistical threshold value;

determine whether the usage data of the customer exceeds the statistical threshold value; and in response to determining that the usage data of the customer exceeds the statistical threshold level, list an identifier of the customer in an excessive usage report.

19. The system according to claim 18, wherein said computing system is configured to:

collect the usage data of a plurality of usage data parameters;

aggregate the usage data for each of the usage data parameters;

compute statistics of the usage data includes computing statistics of the aggregated usage data for each of the usage data parameters;

compute a statistical threshold value for each of the usage data parameters as a function of the statistics of the aggregated usage data;

collect usage data of the customer for each of the usage parameters;

compare usage data for each of the usage data parameters with the statistics of the aggregated usage data for each of the usage data parameters; and in response to determining that the usage data for any of the usage data parameters exceeds a respective statistical threshold value, list the identifier of the customer in the excessive usage report.

20. The system according to claim 19, wherein said computing system is further configured to:

determine whether the customer has violated terms and conditions of a service plan under which the customer is being provided communication services as a result of exceeding a respective statistical threshold value; and in response to determining that the customer has violated terms and conditions of the service plan, take an action against the customer.

21. The system according to claim 20, wherein said computing system, in response to determining that the customer has violated terms and conditions of the service plan, is further configured to provide a selected graphical user element to a user of the communications service provider to select one of a plurality of actions to take against the customer.

22. The system according to claim 20, wherein said computing system is further configured to:

determine one or more terms and conditions of a plurality of terms and conditions that the customer has violated; and list one or more identifiers associated with the respective one or more terms and conditions that the customer has violated in the excessive usage report in association with the identifier of the customer.

23. The system according to claim 22, wherein said computing system, in listing the one or more identifiers associated with the respective one or more terms and conditions, is configured to list an identifier associated with violation of a non-personal use term and condition as a result of communicating a number of SMS messages over the time period that exceeds the statistical threshold level.

24. The system according to claim 18, wherein said computing system is further configured to:

collect the usage data over a plurality of different length time periods;

aggregate the usage data over each of the different length time periods;

compute the statistics over the multiple different length time periods;

compute the statistics threshold over the multiple different length time periods;

access the usage data of the customer over the multiple time periods;

compare the usage data of the customer over the multiple different length time periods;

determine whether the usage data of the customer exceeds the statistical threshold value over the multiple different length time periods; and in response to determining that the usage data of the customer exceeds the statistical threshold level over any of multiple different length time periods, list the identifier of the customer in the excessive usage report.

25. The system according to claim 18, wherein said computing system, in listing the identifier of the customer in the excessive usage report, is configured to list the identifier of the customer for using an excessive number of calling minutes.

26. The system according to claim 18, wherein said computing system, in providing the communications service plan, is configured to provide unlimited communications services for at least a portion of the communications service plan.

27. The system according to claim 26, wherein said computing system, in providing the communications service plan, is configured to provide a prepaid communications service plan.

28. A system for operating communications services of a communications service provider, said system comprising:
a storage unit configured to store information associated with a customer of the communications service provider, at least a portion of the information including information associated with unlimited communications services provided by the communications service provider;
a computing system in communication with said storage unit and being configured to:
collect usage data of the user during a time period associated with the unlimited portion of the service plan; and
determine whether the usage data is indicative of the user using the communications services in violation of service terms and conditions associated with the unlimited portion of the service plan,
wherein said computing system, in determining whether the usage data is indicative of the user using the communications services in violation of service terms and conditions, is configured to:
determine that substantially all calls using the unlimited portion of the service plan from the user are outbound, and
in response that substantially all calls using the unlimited portion of the service plan are outbound, communicate a message to the user so as to notify the user of the violation of service terms and conditions.

29. The system of claim 28, wherein said computing system, in determining whether the usage data is indicative of the user using the communications services in violation of service terms and conditions, is further configured to:
determine an amount of roaming during the time period using the unlimited portion of service plan; and
in response to determining that the amount of roaming is above a threshold roaming value, performing the action by communicating a message to the user that the service terms and conditions are being violated.

30. A system for operating communications services of a communications service provider, said system comprising:
a storage unit configured to store information associated with a customer of the communications service provider, at least a portion of the information including information associated with unlimited communications services provided by the communications service provider;
a computing system in communication with said storage unit and being configured to:
collect usage data of the user during a time period associated with the unlimited portion of the service plan;
determine whether the usage data is indicative of the user using the communications services in violation of service terms and conditions associated with the unlimited portion of the service plan,
wherein said computing system, in determining includes determining that the user is using the unlimited portion of the service plan for non-personal use, and
in response to determining that the user is using unlimited portion of the service plan for non-personal use, performing the action by notifying a service provider of the user and usage thereof.

31. The system of claim 30, wherein said computing system, in determining, is further configured to:
determine the amount of roaming during the time period using the unlimited portion of the service plan; and
in response to determine that the amount of roaming is above a threshold roaming value, perform the action by communicating a message to the user that the service terms and conditions are being violated.

32. A system for operating communications services of a communications service provider, said system comprising:
a storage unit configured to store information associated with a customer of the communications service provider, at least a portion of the information including information associated with unlimited communications services provided by the communications service provider;
a computing system in communication with said storage unit and being configured to:
collect usage data of the user during a time period associated with the unlimited portion of the service plan; and
determine whether the usage data is indicative of the user using the communications services in violation of service terms and conditions associated with the unlimited portion of the service plan,
wherein said computing system, in determining whether the usage data is indicative of the user using the communications services in violation of service terms and conditions, is configured to:
determine an amount of roaming during the time period using the unlimited portion of the service plan, and
in response to determining that the amount of roaming is above a threshold roaming value, perform the action by communicating a message to the user that the service terms and conditions are being violated.

33. The system of claim 32, wherein said computing system, in collecting the usage data, is further configured to:
collect calling data;
total amount of time of calls over the time period; and
wherein said computing system, in determining, is further configured to determine whether the total time is more than a threshold amount of time during the time period.

34. A system for operating communications services of a communications service provider, said system comprising:
a storage unit configured to store information associated with a customer of the communications service provider, at least a portion of the information including information associated with unlimited communications services provided by the communications service provider;
a computing system in communication with said storage unit and being configured to:
collect usage data of the user during a time period associated with the unlimited portion of the service plan; and
determine whether the usage data is indicative of the user using the communications services in violation of service terms and conditions associated with the unlimited portion of the service plan,
wherein said computing system, in determining whether the usage data is indicative of the user using the communications services in violation of service terms and conditions, is further configured to:

determine that a number of data messages communicated by the user using the unlimited portion of the service plan during the time period exceeds a threshold data message value, and in response to determining that the number of data messages exceeds the threshold data message value, perform the action by notifying a service provider of the excessive data message communications.

35. The system according to claim 34, wherein said computing system is further configured to:

determine one or more terms and conditions of a plurality of terms and conditions that the customer has violated; and list one or more identifiers associated with the respective one or more terms and conditions that the customer has violated in the excessive usage report in association with the identifier of the customer.

36. A system for operating communications services of a communications service provider, said system comprising:

a storage unit configured to store information associated with a customer of the communications service provider, at least a portion of the information including information associated with unlimited communications services provided by the communications service provider;

a computing system in communication with said storage unit and being configured to:

collect usage data of the user during a time period associated with the unlimited portion of the service plan; and determine whether the usage data is indicative of the user using the communications services in violation of service terms and conditions associated with the unlimited portion of the service plan, wherein said computing system, in determining whether the usage data is indicative of the user using the communications services in violation of service terms and conditions, is configured to determine that a number of international long distance calls placed using the unlimited portion of the service plan exceed a threshold value, and in response to determining that the number of international long distance calls exceeds a threshold value, notifying a service provider of the excessive number of international long distance calls.

37. The system of claim 36, wherein collecting the usage data includes:

collecting calling data;

totaling amount of time of calls over the time period; and wherein determining includes determining whether the total time is more than a threshold amount of time during the time period.

* * * * *